United States Patent
Van Thorre et al.

(10) Patent No.: US 9,909,078 B2
(45) Date of Patent: *Mar. 6, 2018

(54) MICROWAVE PRODUCED PYROLYSIS OIL FROM BENEFICIATED ORGANIC-CARBON-CONTAINING FEEDSTOCK

(71) Applicant: Biomass Energy Enhancements, LLC, Minneapolis, MN (US)

(72) Inventors: Douglas M Van Thorre, Minneapolis, MN (US); Carleton Drew Tait, North Salt Lake, UT (US); Michael L Catto, Moore, SC (US); Philip James Scalzo, South Jordan, UT (US)

(73) Assignee: Biomass Energy Enhancements, LLC, Zirconia, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/215,281

(22) Filed: Jul. 20, 2016

(65) Prior Publication Data
US 2016/0326444 A1 Nov. 10, 2016

Related U.S. Application Data

(62) Division of application No. 14/305,223, filed on Jul. 1, 2014, now Pat. No. 9,422,481.
(Continued)

(51) Int. Cl.
*C10L 3/00* (2006.01)
*C10L 1/04* (2006.01)
(Continued)

(52) U.S. Cl.
CPC .................. *C10L 1/04* (2013.01); *B01D 3/34* (2013.01); *C10G 1/02* (2013.01); *C10L 3/00* (2013.01);
(Continued)

(58) Field of Classification Search
CPC .................. C10L 2200/0484; C10L 2290/02
(Continued)

(56) References Cited

U.S. PATENT DOCUMENTS

| 4,136,207 A | 1/1979 | Bender |
| 4,235,707 A | 11/1980 | Burke, Jr. |

(Continued)

OTHER PUBLICATIONS

Abdulrazzaq, H., et al., Biochar from Empty Fruit Bunches, Wood, and Rice Husks: Effects on Soil Physical Properties and Growth of Sweet Corn on Acidic Soil, Journal of Agricultural Science, vol. 7 (1) (2015), pp. 192-200.
(Continued)

*Primary Examiner* — Ellen M McAvoy
(74) *Attorney, Agent, or Firm* — Berggren Law Offices, LLC; William R. Berggren; Stephen F. Wolf

(57) ABSTRACT

A processed pyrolysis oil composition, a renewable liquid fuel, having a high energy density, low water content and a more neutral pH, and made with an oxygen-starved microwave sub-system from a processed organic-carbon-containing feedstock made with a beneficiation sub-system is described. Renewable biomass feedstock passed through a beneficiation sub-system to reduce water content to below at least 20 wt % and water-soluble salt reduction of at least 60% from that of unprocessed organic-carbon-containing feedstock on a dry basis. The processed feedstock is introduced into a substantially microwave-transparent reaction chamber. A microwave source emits microwaves which are directed through the microwave-transparent wall of the reaction chamber to impinge on the feedstock within the reaction chamber. The microwave source may be rotated relative to the reaction chamber. The feedstock is subjected to microwaves until the desired reaction occurs to produce a liquid processed pyrolysis oil fuel.

16 Claims, 21 Drawing Sheets

Related U.S. Application Data

(60) Provisional application No. 61/974,876, filed on Apr. 3, 2014, provisional application No. 61/971,329, filed on Mar. 27, 2014, provisional application No. 61/867,952, filed on Aug. 20, 2013.

(51) Int. Cl.
  *C10L 5/44* (2006.01)
  *B01D 3/34* (2006.01)
  *C10G 1/02* (2006.01)
  *C10J 3/72* (2006.01)

(52) U.S. Cl.
  CPC ............... *C10L 5/447* (2013.01); *C10J 3/72* (2013.01); *C10J 2300/092* (2013.01); *C10J 2300/0916* (2013.01); *C10L 2200/0469* (2013.01); *C10L 2290/02* (2013.01); *C10L 2290/04* (2013.01); *C10L 2290/30* (2013.01); *C10L 2290/36* (2013.01); *Y02E 50/10* (2013.01); *Y02E 50/30* (2013.01); *Y02P 20/145* (2015.11)

(58) Field of Classification Search
  USPC ................................... 585/240, 242
  See application file for complete search history.

(56) References Cited

U.S. PATENT DOCUMENTS

| | | | |
|---|---|---|---|
| 4,356,196 A | 10/1982 | Hultquist | |
| 4,600,590 A | 7/1986 | Dale | |
| 4,644,060 A | 2/1987 | Chou | |
| 5,037,663 A | 8/1991 | Dale | |
| 5,171,592 A | 12/1992 | Holtzapple et al. | |
| 5,939,544 A | 8/1999 | Karstens et al. | |
| 6,106,888 A | 8/2000 | Dale et al. | |
| 6,176,176 B1 | 1/2001 | Dale et al. | |
| 8,168,840 B2* | 5/2012 | Brady | C08L 97/00 127/2 |
| 8,361,282 B2 | 1/2013 | Van Thorre et al. | |
| 8,425,633 B2* | 4/2013 | Banasiak | C10B 49/10 201/13 |
| 8,519,203 B2* | 8/2013 | Marinangeli | C10G 3/44 44/605 |
| 8,519,205 B2* | 8/2013 | Frey | C10B 49/22 44/307 |
| 8,637,718 B2* | 1/2014 | Gupta | C10G 1/02 202/117 |
| 8,748,680 B2* | 6/2014 | Hogendoorn | C10G 45/06 208/113 |
| 8,979,955 B2* | 3/2015 | Agblevor | 423/644 |
| 9,540,580 B2* | 1/2017 | Van Thorre | B01J 19/126 |
| 9,545,609 B2* | 1/2017 | Van Thorre | B01J 19/126 |
| 9,670,413 B2* | 6/2017 | Baird | C10B 49/10 |
| 2007/0031918 A1 | 2/2007 | Dunson, Jr. et al. | |
| 2007/0037259 A1 | 2/2007 | Hennessey et al. | |
| 2009/0053771 A1 | 2/2009 | Dale et al. | |
| 2010/0162619 A1 | 7/2010 | Peus | |
| 2011/0219679 A1* | 9/2011 | Budarin | C10B 19/00 44/605 |
| 2011/0256615 A1 | 10/2011 | Brady et al. | |
| 2013/0156655 A1 | 6/2013 | Van Thorre et al. | |
| 2013/0298454 A1 | 11/2013 | Bai | |
| 2014/0230317 A1* | 8/2014 | Liu | C10L 1/02 44/307 |
| 2015/0051428 A1* | 2/2015 | Dayton | C10B 53/02 585/242 |
| 2015/0052805 A1* | 2/2015 | Catto | C10L 5/447 44/589 |
| 2015/0065762 A1* | 3/2015 | Agblevor | B01J 38/02 585/16 |
| 2015/0083571 A1 | 3/2015 | Van Thorre et al. | |
| 2015/0225652 A1* | 8/2015 | Lei | C10K 3/02 585/242 |
| 2015/0329789 A1* | 11/2015 | Mandan | C10G 3/46 585/240 |
| 2015/0342224 A1* | 12/2015 | Medoff | A23L 5/30 426/63 |
| 2015/0361369 A1* | 12/2015 | Tait | C10L 5/447 44/589 |
| 2016/0144351 A1* | 5/2016 | Boldor | C10B 53/02 201/2.5 |

OTHER PUBLICATIONS

Mohan, D. et al., "Pyrolysis of Wood/Biomass for Bio-oil: A Critical Review", Energy & Fuels, vol. 20 (2006), pp. 848-889.

Jahirul, M. I., et al., Biofuels Production through Biomass Pyrolysis—A Technological Review, Energies, vol. 5 (2012), pp. 4952-5001.

Sadaka, S., et al., "Pyrolysis and Bio-oil", University of Arkansas, United States Department of Argiculture, publication FSA1052 (2014).

Hardie, M., et al., "Does Biochar Influence Soil Physical Properties and Soil Water Availability?", Tasmanian Institute of Agriculture Paper of the Month, Monday 24, 2014, available online at www.tia.tas.edu.au.

Zacher, A., et al., "Direct Thermochemical Liquifaction", IEA Bioenergy Task 34, Jan. 2016.

Gary Brodeur et al.;Chemical and Physicochemical Pretreatment of Lignocellulosic Biomass: A Review; SAGE—Hindawi Access to Research, Enzyme Research, vol. 2011, Article IC 787532, 17 pages.

* cited by examiner

| Biomass Dewatering Alternatives 50% to 12% Moisture | | | | | | |
|---|---|---|---|---|---|---|
| | Units | Mechanical | Physiothermal | Thermal | Physiochemical | | |
| | | | | | CH3OH+H2O | H2CO3+H2O | H2O Only |
| Capable of reducing moisture content to <20% | | No | Yes | Yes | Yes | Yes | Yes |
| Soluable Salts Extraction | | 30% - 50% | 0% - 25 | ~0% | 75% - 90% | 75% - 90% | 75% - 90% |
| Product Suitable for Bacteria/Enzyme Digestion | | Yes | Yes | Yes | Yes | Yes | No |
| Product Suitable for Co-firing w/ Coal @ > 30% | | No | No | No | Yes | Yes | Yes |
| Scalable to 20 TPH | | Yes | Yes | Yes | Yes | Yes | Yes |
| Capital Cost Multiplier | | 3 | 6 | 0.85 | 1 | 1 | 1 |
| O&M Multiplier | | 1.2 | 1.2 | 1.2 | 1 | 1 | 1 |
| Availability Multiplier | | 0.8 | 0.85 | 0.9 | 1 | 1 | 1 |
| | | | | | | | |
| Thermal Energy Req | | | | | | | |
| Working Fluid | | n/a | H2O | H2O | Ammonia | MeOH | H2O |
| Weight of Working Fluid/lb biomass | lb | 0.38 | 0.38 | 0.38 | 1.50 | 1.50 | 1.50 |
| Specific Heat | BTU/lb-°F | n/a | 1.00 | 1.00 | 0.52 | 0.61 | 1.00 |
| Heat of Vaporization | BTU/lb | n/a | 970.80 | 970.80 | 550.00 | 473.00 | 970.80 |
| T1 (initial temperature after SS) | °F | n/a | 59 | 59 | 59 | 59 | 59 |
| T2 (final temperature) | °F | 59 | 212 | 212 | 125 | 347 | 347 |
| % liquid converted to Steam | % | n/a | 100% | 100% | 20% | 20% | 19% |
| Energy Recovered % from Delta T | % | n/a | 10% | 20% | 90% | 90% | 90% |
| Energy Recovered % from Steam | % | n/a | 30% | 30% | 70% | 70% | 70% |
| Delta T Biomass (T2 - T1) | °F | n/a | 153 | 153 | 66 | 288 | 288 |
| Energy Req. for Delta T | BTU/lb | n/a | 58.14 | 58.14 | 51.48 | 261.36 | 432.00 |
| Energy Req. for Vaporization | BTU/lb | n/a | 368.83 | 368.83 | 165.00 | 141.90 | 276.62 |
| Total Energy Required (Gross) | BTU/lb | n/a | 426.97 | 426.97 | 216.48 | 403.26 | 708.62 |
| Energy Recovered from Delta T | BTU/lb | n/a | 5.81 | 11.63 | 46.33 | 235.22 | 388.80 |
| Energy Recovered from Steam | BTU/lb | n/a | 110.65 | 110.65 | 115.50 | 99.33 | 193.63 |
| Total Energy Recovered | BTU/lb | n/a | 116.46 | 122.28 | 161.83 | 334.55 | 582.43 |
| Total Energy Required (Net) | BTU/lb | 0.00 | 310.51 | 304.69 | 54.65 | 68.71 | 126.19 |
| Total Thermal Energy Req. /Ton | MMBTU/WT | 0 | 0.62 | 0.61 | 0.1093 | 0.1374 | 0.25 |
| | | | | | | | |
| Mecahnical Energy | | | | | | | |
| Chipping | BTU/lb | 90.00 | 90.00 | 48.00 | 48.00 | 48.00 | 48.00 |
| Process | BTU/lb | 100.00 | 50.00 | 10.00 | 22.00 | 22.00 | 22.00 |
| Packaging | BTU/lb | 15.00 | 0.00 | 25.00 | 15.00 | 15.00 | 15.00 |
| Total Mechanical Energy Required | BTU/lb | 205.00 | 140.00 | 83.00 | 85.00 | 85.00 | 85.00 |
| Total Mach. Energy Req. /Ton | MMBTU/WT | 0.41 | 0.28 | 0.17 | 0.17 | 0.17 | 0.17 |
| Total Energy Required/Pound | BTU/lb | 205.00 | 450.51 | 387.69 | 139.65 | 153.71 | 211.19 |
| Total Energy Required/Ton (1) | MMBTU/WT | 0.41 | 0.90 | 0.78 | 0.28 | 0.31 | 0.42 |
| Illustrative Cost of Req. Energy (Diesel @$4.00/Gal) | $/WT | $11.71 | $25.74 | $22.15 | $7.98 | $8.78 | $12.07 |
| (1) Mechanical method cannot achieve 12% moisture content. | | | | | | | |

Fig. 7

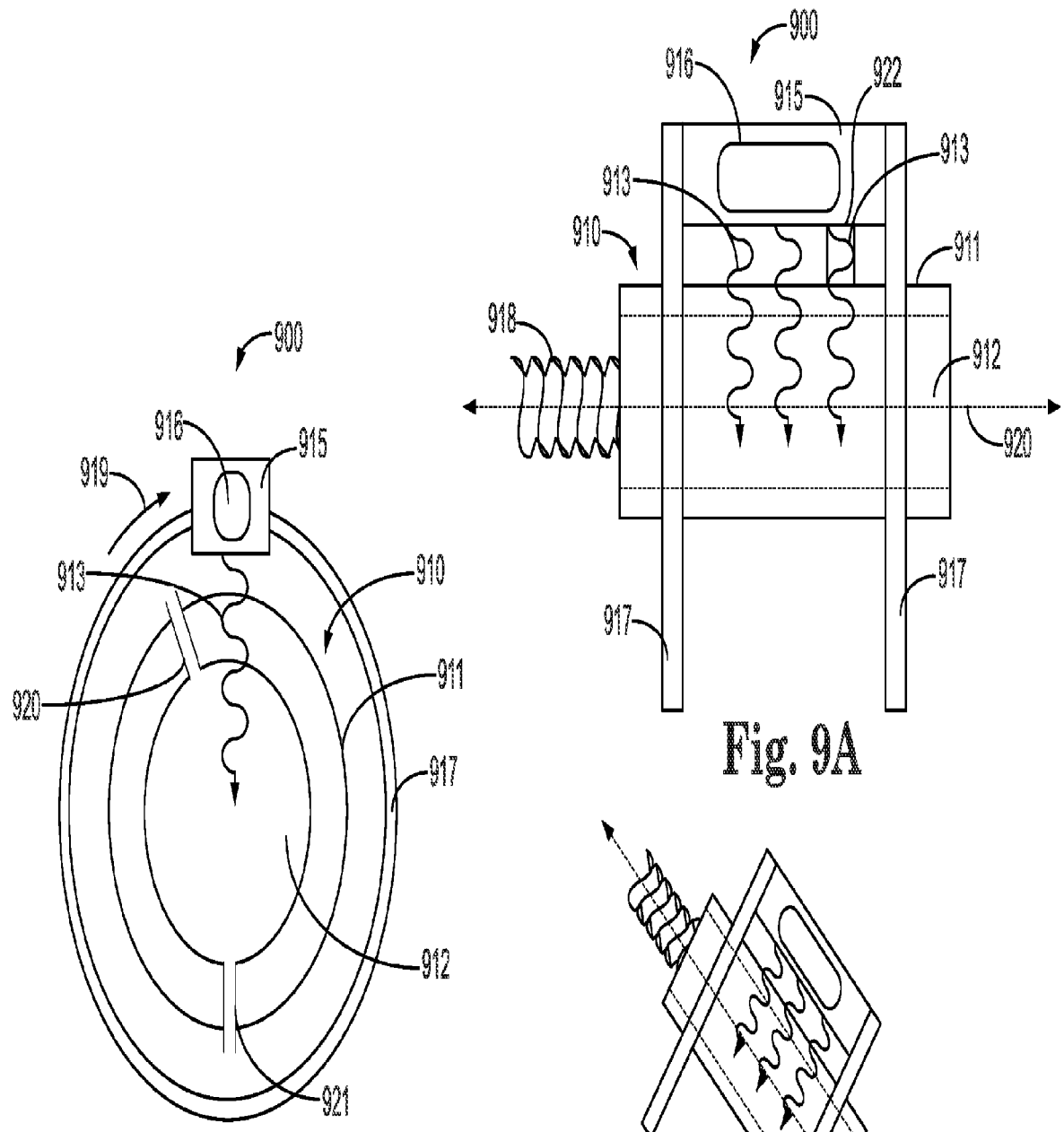

|  | Herbaceous Plants | Soft Woods | Hard Woods |
|---|---|---|---|
| Wet Fiber Disruption |  |  |  |
| • Solvent medium | Water | Water; Water/Methanol | Water |
| • Residence time, min. | 15 to 25 | 20 to 35 | 30 to 45 |
| • Temperature profile, °C | 130 to 160 | 165 to 205 | 180 to 215 |
| • Pressure profile, max psig | 260 to 280 | 280-385 water; 640-650 $H_2O$/MeOH | 375 to 425 |
| Vapor Explosion |  |  |  |
| • Initial Pressure Drop, psi. | 230 to 250 | 250-350 water; 600-620 $H_2O$/MeOH | 345 to 400 |
| • Explosive duration, milliseconds | 50 | 50 | 50 |
| Compaction |  |  |  |
| • Pressure plate patterned, Y/N. | Y | Both Y and N | Both Y and N |
| Starting water content, % | 70 to 80 | 45 to 75 | 40 to 50 |
| Processed water content, % | 4 to 15 | 4 to 15 | 4 to 15 |
| % Fixed carbon (d/b) (before->after) | 25 to 50 ---> 40 to 65 | 20 to 35 ---> 40 to 55 | 40 to 50 ---> 45 to 55 |
| % Volatiles (d/b) (before->after) | 40 to 70 ---> 30 to 40 | 60 to 80 ---> 30 to 50 | 40 to 50 ---> 35 to 50 |
| % Ash (d/b) (before->after) | 5 to 15 ---> 5 to 10 | 3 to 6 ---> 1 to 3 | 1 to 5 ---> < 3 |
| Heat Content, LHV (before->after), BTU/lb | 1,500 to 2,500 ---> 7,000 to 10,500 | 1,900 to 4,600 ---> 9,000 to 11,000 | 3,000 to 5,000 ---> 9,000 to 11,000 |

Fig. 16

MICROWAVE PRODUCED PYROLYSIS OIL FROM BENEFICIATED ORGANIC-CARBON-CONTAINING FEEDSTOCK

RELATED APPLICATIONS

This application is a divisional application of U.S. patent application Ser. No. 14/305,223, filed Jul. 1, 2014, now allowed which claims priority to Prov. Pat. Appl. Ser. No. 61/974,876, filed Apr. 3, 2014, 61/971,329, filed Mar. 27, 2014, and 61/867,952, filed Aug. 20, 2013, all of which are incorporated by reference in their entirety.

FIELD OF THE INVENTION

The present invention relates generally to the production of liquid pyrolysis oil fuel from an organic-carbon-containing feedstock.

BACKGROUND OF THE INVENTION

The vast majority of fuels are distilled from crude oil pumped from limited underground reserves or mined from coal. As the earth's crude oil supplies become more difficult and expensive to collect and there is growing concerns about the environmental effects of coal other than clean anthracite coal, the world-wide demand for energy is simultaneously growing. Over the next ten years, depletion of the remaining world's easily accessible crude oil reserves and clean anthracite coal reserves will lead to a significant increase in cost for fuel obtained from crude oil and coal.

The search to find processes that can efficiently convert biomass to fuels and by-products suitable for transportation and/or heating is an important factor in meeting the ever-increasing demand for energy. In addition, processes that have solid byproducts that have improved utility are also increasingly in demand.

Biomass is a renewable organic-carbon-containing feedstock that contains plant cells and has shown promise as an economical sourced of fuel. However, this feedstock typically contains too much water and contaminants such as water-soluble salts to make it an economical alternative to common sources of fuel such as coal, petroleum, or natural gas.

Historically, through traditional mechanical/chemical processes, plants would give up a little less than 25 weight percent of their moisture. And, even if the plants were sun or kiln-dried, the natural and man-made chemicals and water-soluble salts that remain in the plant cells combine to create corrosion and disruptive glazes in furnaces. Also, the remaining moisture lowers the heat-producing MMBTU per ton energy density of the feedstock thus limiting a furnace's efficiency. Centuries of data obtained through experimentation with a multitude of biomass materials all support the conclusion that increasingly larger increments of energy are required to achieve increasingly smaller increments of bulk density improvement. Thus, municipal waste facilities that process organic-carbon-containing feedstock, a broader class of feedstock that includes materials that contain plant cells, generally operate in an energy deficient manner that costs municipalities money. Similarly, the energy needed to process agricultural waste, also included under the general term of organic-carbon-containing feedstock, for the waste to be an effective substitute for coal or petroleum are not commercial without some sort of governmental subsidies and generally contain unsatisfactory levels of either or both water or water-soluble salts. The cost to suitably prepare such feedstock in a large enough volume to be commercially successful is expensive and currently uneconomical. Also, the suitable plant-cell-containing feedstock that is available in sufficient volume to be commercially useful generally has water-soluble salt contents that result in adverse fouling and contamination scenarios with conventional processes. Suitable land for growing a sufficient amount of energy crops to make economic sense typically are found in locations that result in high water-soluble salt content in the plant cells, i.e., often over 4000 mg/kg on a dry basis.

Efforts to make a synthetic liquid fuel called pyrolysis oil, also known as biocrude or biooil, from organic-carbon-containing feedstock have been tried as a substitute for petroleum. Present methods of making pyrolysis oil have not resulted in a satisfactory liquid feedstock for petroleum refineries. The efforts to date have not been economically viable as the processed feedstock generally contain unsatisfactory amounts of water-soluble salts that can contribute to corrosion, fouling, and slagging in combustion equipment, and have high water content that reduces the energy density to well below that of petroleum in large part because of the retained moisture. However, there remains a need for processed pyrolysis oil as a clean renewable source of liquid fuel if it could be made cost-effectively with a more substantial reduction in its content of water and water-soluble salt.

SUMMARY OF THE INVENTION

A processed pyrolysis oil composition from beneficiated feedstock and a process of making the composition is provided. The renewable processed pyrolysis oil composition comprises a liquid carbon fuel with characteristics that include an energy density of at least 33.0 MMBTU/ton (38.4 GJ/MT), a water content of less than 15 wt %, and a pH of at least as high as 4.0. The processed pyrolysis oil is made from unprocessed organic-carbon-containing feedstock that is converted into the processed organic-carbon-containing feedstock with a beneficiation sub-system, and to the processed pyrolysis oil with a microwave sub-system. The process of making a pyrolysis oil composition, a liquid petroleum substitute fuel, comprises three steps. The first step is to input into a system comprising a first sub-system and a second sub-system an unprocessed organic-carbon-containing feedstock that includes free water, intercellular water, intracellular water, intracellular water-soluble salts, and at least some plant cells comprising cell walls that include lignin, hemicellulose, and microfibrils within fibrils. The second step is to pass the unprocessed organic-carbon-containing feedstock through the first sub-system, a beneficiation sub-system process, to result in processed organic-carbon-containing feedstock having a water content of less than 20 wt % and a salt content that is reduced by at least 60 wt % on a dry basis from that of the unprocessed organic-carbon-containing feedstock. The third step is to pass the processed organic-carbon-containing feedstock through a microwave sub-system process to result in the pyrolysis oil composition, a liquid fuel having an energy density of at least 33.0 MMBTU/ton (38.4 GJ/MT), a water content of less than 15 wt %, and a pH of at least as high as 4.0.

The invention is a processed pyrolysis oil that is a suitable clean petroleum substitute for refineries that convert petroleum into useful fuels, and other products. Thus a wide range of renewable organic-carbon-containing feedstock can now be made into a clean economically viable petroleum substitute. The uniform low water content and uniform, high energy density of the beneficiated organic-carbon-containing feedstock used to make the processed pyrolysis oil allows for a wide variety of renewable organic-carbon-containing feedstock to be used in the microwave section of the process in a cost efficient manner. In addition, the processed pyrolysis oil is much less acidic that even pyrolysis oil made with a similar microwave sub-system but using unprocessed organic-carbon-containing feedstock with its higher water and water-soluble salt content instead of feedstock that has been processed in the beneficiation sub-system. Further, the energy needed to remove water from unprocessed organic-carbon-containing feedstock described above to a content of below 20 wt % and a substantial amount of the water-soluble salt with the invention is significantly less than for conventional processes. In some embodiments, the total cost per weight of the beneficiated feedstock is reduced by at least 60% of the cost to perform a similar task with known mechanical, physiochemical, or thermal processes to prepare renewable organic-carbon-containing feedstock for use in subsequent fuel making operations.

The above summary is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIG. 7 is a table illustrating the estimated energy consumption needed to remove at least 75 wt water-soluble salt from organic-carbon-containing feedstock and reduce water content from 50 wt % to 12 wt % with embodiments of the beneficiation sub-system of the invention compared with known processes.

FIGS. 9A and 9B illustrate side and cross sectional views, respectively, of a reaction chamber of an embodiment of a microwave sub-system configured to convert organic-carbon-containing materials to processed pyrolysis oil.

FIG. 9C is a diagram of a tilted reaction chamber of an embodiment of the microwave sub-system.

FIG. 16 is a table showing relative process condition ranges and water and water-soluble salt content for three types of organic-carbon-containing feedstock used in the beneficiation sub-system.

Figure 1:
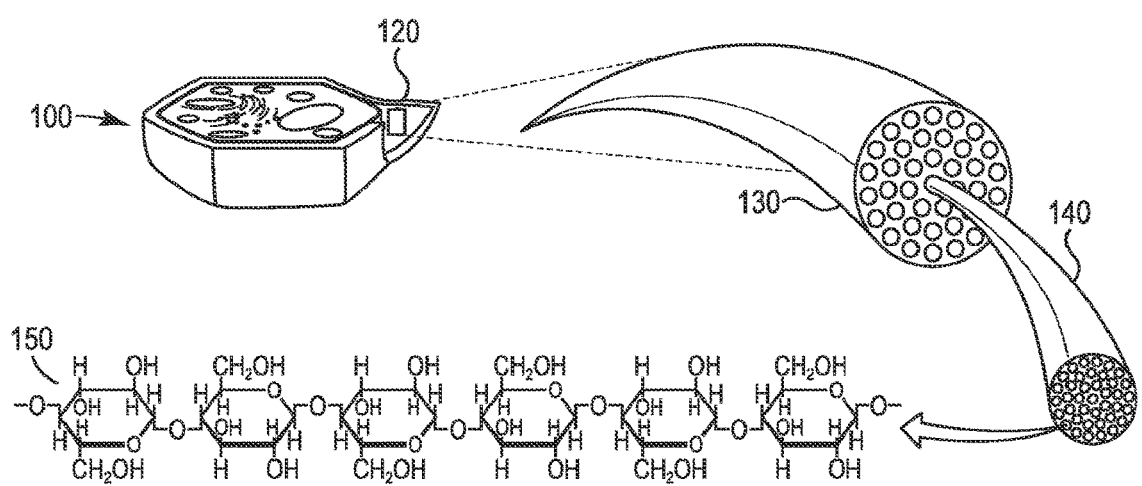
FIG. 1 is a diagram of a typical plant cell with an exploded view of a region of its cell wall showing the arrangement of fibrils, microfibrils, and cellulose in the cell wall.

While the invention is amenable to various modifications and alternative forms, specifics have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF VARIOUS EMBODIMENTS

The processed pyrolysis oil of the invention is a liquid fuel made by passing beneficiated processed organic-carbon-containing feedstock through a microwave system. The processed pyrolysis oil of the invention is at least equivalent to petroleum in energy density. The pyrolysis oil of the invention has the advantages of coming from a renewable source, agricultural and plant materials, without the burdens of current biomass processes that are inefficient, do not remove enough water, and remove less if any of the salt found in unprocessed renewable biomass. There are several aspects of the invention that will be discussed: processed pyrolysis oil, unprocessed renewable organic-carbon-containing feedstock, beneficiation sub-system, microwave sub-system, beneficiation sub-system process, and microwave sub-system process.

Processed Pyrolysis Oil

Bio-oil made from renewable unprocessed organic-carbon-containing feedstock by the process discussed below is referred to as processed pyrolysis oil in this document. The pyrolysis oil of the invention comprises a liquid carbon fuel comprising an energy density of at least 33.0 MMBTU/ton (38.4 GJ/MT), a water content of less than 15 wt % water, and a pH at least higher than 4.0. Because the beneficiation sub-system removes most of the intracellular water, some embodiments of the processed pyrolysis oil may have water contents of less than 10 wt % and some less than 5 wt %. Further, the pH of the resulting processed pyrolysis oil is higher than even that of pyrolysis oil made by a similar microwave sub-section but using unprocessed organic-carbon-containing feedstock instead of processed organic-carbon-containing feedstock made by passing unprocessed organic-carbon-containing feedstock through the beneficiation sub-system. The processed pyrolysis oil is made from unprocessed organic-carbon-containing feedstock that is converted into a processed organic-carbon-containing feedstock in a beneficiation sub-system, and that is then passed through a microwave sub-system to become a liquid petroleum substitute having the properties mentioned. As used in this document, processed pyrolysis oil is the liquid product of the devolatization of beneficiated organic-carbon-containing feedstock. Organic-carbon-containing feedstock used to make the processed pyrolysis oil of the invention may contain mixtures of more than one renewable feedstock. The energy density of processed pyrolysis oil is desired to be near that of petroleum or crude oil. Typical crude oil has an energy density of 37.8 MMBTU/ton (43.9 GJ/MT). Pyrolysis oil made by currently known processes has an energy density that is substantially below that value, sometimes on the order of half that value, thus making many sources of feedstock economically impractical as a petroleum substitute in refineries.

Petroleum is currently the primary supply of liquid fuel. It is from biomass that has been underground for millions of years. It is not considered to be renewable liquid fuel because it cannot be replenished over the lifetime of a human. Depending on the source impurities can vary. The principle impurity is sulfur and the types of petroleum range from sweet crude to sour crude depending on the sulfur content, less than 0.42 wt % or greater than 0.5 wt %, respectively. Sweet crude oil contains small amounts of hydrogen sulfide and carbon dioxide. The sulfur content ranges from as little as 0.0 to less than 0.42 wt %. High-quality, low-sulfur crude oil is commonly used for processing into gasoline and is in high demand, particularly in the industrialized nations. "Light sweet crude oil" is the most sought-after version of crude oil as it contains a disproportionately large fraction that is directly processed (fractionation) into gasoline (naphtha), kerosene, and high-quality diesel (gas oil). Sour crude oil is crude oil containing a high amount of the impurity sulfur, i.e., from 0.5 wt % to 8.0 wt %. The majority of the sulfur in crude oil occurs bonded to carbon atoms, with a small amount occurring as elemental sulfur in solution and as hydrogen sulfide gas. Sour oil can be toxic and corrosive, especially when the oil contains higher levels of hydrogen sulfide. At low concentrations the oil has the smell of rotten eggs. Sour crude oil needs to be stabilized by having hydrogen sulfide gas ($H_2S$) removed from it before being transported by oil tankers for safety reasons.

As supplies of easily reached petroleum dwindle, efforts increase to find alternatives that are preferable renewable, clean, and cost effective. Pyrolysis oil is the liquid product of the decomposition of renewable organic-carbon-containing feedstock that has been under investigation as a substitute for petroleum. Efforts to extract it from biomass, a biological material derived from living or recently living plants, have resulted in a kind of liquid oil that normally contains unsatisfactorily high levels of oxygen to become a hydrocarbon useful in distillation processes designed to make specific hydrocarbon liquids and gases. Present methods to extract pyrolysis oil from organic-carbon-containing feedstock involves the thermal, chemical and biochemical methods for the destructive distillation of dried biomass in a reactor at temperature of about 500° C. with subsequent cooling.

In pyrolysis oil made by thermal heat or infrared radiation (IR), the heat is absorbed on the surface of any organic-carbon-containing feedstock and then is re-radiated to the next level at a lower temperature. This process is repeated over and over again until the IR radiation penetrates to the inner most part of the feedstock. All the material in the feedstock absorbs the IR radiation at its surfaces and different materials that make up the feedstock absorb the IR at different rates. A delta temperature of several hundreds of degrees C. can exist between the surface and the inner most layers or regions of the feedstock. As a result, the solid organic-carbon-containing feedstock locally passes through a liquid phase before it is volatilized. This variation in temperature may appear in a longitudinal direction as well as radial direction depending on the characteristics of the feedstock, the rate of heating, and the localization of the heat source. This variable heat transfer from the surface to the interior of the feedstock can cause cold and hot spots, thermal shocks, uneven surface and internal expansion cracks, fragmentation, eject surface material and create aerosols. All of this can result in microenvironments that cause side reactions with the creation of many different end products. These side reactions are not only created in the feedstock but also in the volatiles that evaporate from the feedstock and occupy the vapor space in the internal reactor environment before being collected.

A common IR radiation process, pyrolysis, produces biochar, liquids, and gases from biomass by heating the biomass in a low/no oxygen environment. The absence of oxygen prevents combustion. The relative yield of products from pyrolysis varies with temperature. Temperatures of 400-500° C. (752-932° F.) produce more char, while temperatures above 700° C. (1,292° F.) favor the yield of liquid and gas fuel components. Pyrolysis occurs more quickly at the higher temperatures, typically requiring seconds instead of hours. Typical yields are 60% bio-oil, 20% biochar, and 20% organic volatiles. In the presence of stoichiometric oxygen concentration, high temperature pyrolysis is also known as gasification, and produces primarily syngas. By comparison, slow pyrolysis can produce substantially more char, on the order of about 50%.

Recently, a microwave system similar to the microwave sub-system has been used to convert unprocessed organic-carbon-containing feedstock discussed in this document into pyrolysis oil. Such pyrolysis oil has a water content of over 20 wt % because of the tenaciously held intracellular water found in all plant material used as feedstock. With microwave radiation, the solid part of the feedstock is nearly transparent to the microwave radiation and most of the microwave radiation just passes through. In contrast to the small absorption cross section of the solid feedstock, gaseous and liquid water strongly absorb the microwave radiation increasing the rotational and torsional vibrational energy of the water molecules. Therefore, the gaseous and liquid water that is present is heated by the microwaves, and these water molecules subsequently indirectly heat the solid processed organic-carbon-containing feedstock. When the free water and intercellular water is all evaporated then some of the microwaves start to be absorbed by the remaining feedstock and further heat it up within a reflecting enclosure that cause the microwave radiation to pass through the feedstock numerous times. Microwave radiation can complete the conversion of feedstock at lower temperatures than IR and thermal heating and occur during shorter timeframes. Operating temperature reductions may range from 10-30% lower on a degrees C. basis and heating times may be reduced by a quantity equal to one-half to one-tenth of that needed by IR radiation to accomplish a similar degree of decomposition of a specified feedstock. All this can result in an evenly heated feedstock from the inside out so there are reduced microenvironments, fewer side reactions, and cleaner volatiles to collect.

The atmosphere in the reaction chamber is free of externally supplied oxygen. In some embodiments, the atmosphere is inert, such as, for example, nitrogen. In some embodiments, the atmosphere may contain a small amount of water that previously had not been completely removed from the organic-carbon-containing feedstock being processed before it entered the reaction chamber.

The resulting renewable pyrolysis oil from the microwave process system discussed herein is the devolatilized carbon residue of an irradiated processed organic-carbon-containing hydrocarbon feedstock. The microwave system discussed herein can process organic-carbon-containing feedstock that does not contain much water when it enters the reaction chamber. However, the conversion is more efficient, i.e., faster rates and at lower temperatures, when water or water-associated molecules are present. Some efficient conversions occur when the water content in the organic-containing feedstock as it enters the reaction chamber is at least 5 percent by weight and less than 15 percent by weight. Some occur when the water is at least 6 percent by weight and less than 12 percent by weight. For purposes of this document, water includes free water, interstitial water, cellular water, and the water portion that may be combined with other molecules to form hydrated compounds. During the early exposure of the feedstock to the microwaves, the uniform heating of the water throughout the volume of the feedstock particles results in the creation of more numerous and more uniform pores. Because processed organic-carbon-containing feedstock contains water, the below discussion will focus on those feedstock. However, similar results may occur for those not containing water but less efficiently.

The renewable pyrolysis oil made with the microwave irradiation of the unprocessed organic-carbon-containing feedstock has several improved characteristics when compared to a similar feedstock that is processed with IR radiation as discussed above. In general, it is more like petroleum in its distillation behavior than that made by thermal processes, containing minimal oxides, water, corrosive impurities, and undesirable contaminants such as tar, a thicker hydrocarbon associated with hydrocarbons with chains of over $C_{24}$. First, because most of the free water is removed evenly from the surface to the center of the organic-carbon-containing feedstock, this free water does not then mix with the pyrolysis oil, only to next have to be removed by further processing to be a useful distillation feedstock. In addition, organic-carbon-containing feedstock that contain lignin experience a better conversion of the lignin to pyrolysis oil with the desirable properties discussed below because the lignin is more dehydrated in the microwave process discussed herein.

Because the pyrolysis oil has significantly less oxygen content, the specific gravity is less than 1.2 or lower than that of pyrolysis oil made with similar feedstock by an IR process and is dependent on feedstock. Specific gravity of pyrolysis oil by the oxygen-starved microwave process of this disclosure is less than 1.2 and greater than 1.05 compared to that of a thermal process of over 1.2 and under 1.3. Some embodiment of the pyrolysis oil of the invention have a specific gravity of less than 1.2, some of less than 1.15, and some of less than 1.1. For reference, the specific gravity of water is 1.0 and diesel fuel is 0.8. Some embodiments of the pyrolysis oil have a specific gravity that is at least 0.1 less than it would have been in a pyrolysis oil composition made with the same feedstock but using a thermal process that creates a liquid phase during the process, some embodiments at least 0.15 less, and some at least 2.0 less. Also, some embodiments of the pyrolysis oil of the invention have an oxygen content that is at least 20 percent less than that made with the same feedstock by an IR process.

Second, the pyrolysis oil has lower acid content than that made with the same feedstock by an IR process. As a result, the pyrolysis oil of the invention is more stable, less corrosive, and less reactive to various other components in the pyrolysis oil than the pyrolysis oil made with the same feedstock by an IR process. The pH of pyrolysis oil made with the microwave process disclosed herein typically ranges from 3.0 to 4.0 and is dependent on feedstock. Pyrolysis oil made by an IR process has a pH of between 0.5 and 2.5 for similar feedstock. The pyrolysis oil made with the oxygen-starved microwave process has a pH of at least 3.0, in some at least 3.2, in some at least 3.4, some at least 3.6, and in some at least 3.8.

Third, the pyrolysis oil has fewer undesirable impurities such as higher molecular weight tar and char particles that are common in pyrolysis oil made with an IR process. Because of the uniform conditions in an oxygen-starved atmosphere, the pyrolysis oil contains fewer char particles than pyrolysis oil made with the same feedstock by an IR process. Some embodiments of the pyrolysis oil of the invention have at least 50 percent by weight less char particles, some embodiments have at least 60 percent less, some embodiments have at least 70 percent less, and some embodiments have at least 80 percent less. For similar reasons, the pyrolysis oil contains less tar than pyrolysis oil made with the same feedstock by an IR process. Some embodiments of the pyrolysis oil of the invention have at least 30 percent by weight less tar, some embodiments have at least 40 percent less, some embodiments have at least 50 percent less, and some embodiments have at least 60 percent less.

Fourth, the renewable pyrolysis oil of the invention is as clean or cleaner than all forms of petroleum. What little sulfur content, there is in the processed organic-carbon-containing feedstock, less than 0.1 wt %, is confined in the processed biochar.

In contrast, the process to make the processed pyrolysis oil of the invention uses a beneficiation sub-system to remove a substantial amount of the difficult to remove intracellular water and water-soluble salt from the unprocessed organic-carbon-containing feedstock and microwave radiation from the oxygen-starved microwave sub-system. The beneficiation sub-system used any unprocessed organic-carbon-containing feedstock that includes free water, intercellular water, intracellular water, intracellular water-soluble salts, and at least some plant cells comprising cell walls that include lignin, hemicellulose, and microfibrils of cellulose within cellulosic fibrils. With conditions preselected for each type of unprocessed organic-carbon-containing feedstock, the beneficiation sub-system converts the unprocessed feedstock to processed feedstock having less than 20 wt % water, and a salt content that is reduced by at least 60 wt % on a dry basis from that of the unprocessed organic-carbon-containing feedstock.

The effect of total water content reduction is substantial. Now the microwave system is able to produce processed pyrolysis oil having a water content of less than 15 wt %. Some embodiments have a water content of less than 10 wt %; some have a water content of less than 5 wt %. As a result the energy density of the processed pyrolysis oil is approaching that of petroleum but from a cleaner renewable organic-carbon-containing feedstock.

The processed pyrolysis oil of the invention has an energy density of at least 33.0 MMBTU/ton (38.4 GJ/MT). Other embodiments have an energy density of at least 34.0 MMBTU/ton (39.5 GJ/MT), at least 35.0 MMBTU/ton (40.7 GJ/MT), at least 36.0 MMBTU/ton (41.9 GJ/MT), at least 37.0 MMBTU/ton (43/0 GJ/MT), and at least 37.8 MMBTU/ton (43.9 GJ/MT) depending on the amount of water that is in the processed pyrolysis oil.

Moreover, different unprocessed organic-carbon-containing feedstock having widely different energy densities is able to obtain similar energy densities once they pass through the beneficiation sub-system to become processed organic-carbon-containing feedstock. This allows processed feedstock from such unbeneficiated feedstock as herbaceous plants to be mixed with processed feedstock from such unbeneficiated feedstock as wood waste in the microwave subsystem to produce the processed pyrolysis oil of the invention. Processed organic-carbon-containing feedstock used to make the processed pyrolysis oil of the invention can contain mixtures of more than one renewable feedstock, even if they have very different energy densities before passing through the beneficiation subsystem.

The effect of water-soluble salt on pyrolysis oil is indirect, not direct. Water-soluble salts will stay behind in the solid phase or processed biochar in the microwave sub-system and not be distilled into the oil. Therefore, reduction of water-soluble salt in processed organic-carbon-containing feedstock passing into the microwave sub-system will not have a direct corresponding reduction in salt content in the processed pyrolysis oil. Some salt may transfer by contact of pyrolysis oil with char or surface ejected fragments and aerosols, so reducing salt will reduce salt in bio-oil. However, the removal of the water-soluble salt has an indirect effect of reducing side reactions that adversely affect the uniformity of the processed pyrolysis oil. These side reactions will contribute to some levels of acidic oxides, corrosive impurities, and undesirable contaminants such as tar. Less salt may reduce non-uniform heating during microwave process. Microwaves are likely to have different microenvironments near salt areas than non-salt areas.

Processed pyrolysis oil that is less acidic also is more purely liquid hydrocarbon because there are less side reactions that result in corrosive materials and undesirable contaminants. The acidity of the processed pyrolysis oil of the invention is greatly reduced—approaching neutrality, i.e., a pH of 7.0. The beneficiated processed organic carbon-containing feedstock has less volatile species that lead to acidity in pyrolysis oil. One example of a reduced acid causing volatile is acetic acid from acetyl groups in hemicellulose. The pH of the processed is at least as high as 4.0. In some embodiments, the pH is at least as high as 4.5, in some 5.0, and in some 5.5.

The processed pyrolysis oil is more homogeneous than that made by processes using unprocessed organic carbon-containing feedstock. The greater homogenization of the processed organic carbon-containing feedstock reduces non-uniform heating during microwave part of the system.

In addition, adverse decomposition components are decreased. The processed organic-carbon-containing feedstock contains less adverse volatiles as discussed below under the beneficiation sub-system. Also, the bio char particles that pass with the processed pyrolysis oil before the particles are filtered out cause decomposition of the processed pyrolysis oil. Thus it is important to quickly separate the processed pyrolysis oil from biochar to minimize this decomposition. It is believed biochar that contains substantially less water-soluble salt is less likely to decompose processed pyrolysis oil than biochar containing more water-soluble salt.

As a result of the above changes to the processed organic-carbon-containing feedstock, the resulting processed pyrolysis oil has a lower specific gravity than pyrolysis oil from passing unprocessed organic-carbon-containing feedstock through a microwave system similar to the microwave sub-system of the invention. The specific gravity of the processed pyrolysis oil is at least as low as 1.05. Some embodiments are as least as low as 1.0 and some embodiments are less than 1.0. Some embodiments have a processed pyrolysis oil with a specific gravity that is at least 0.05 less than it would have been in a pyrolysis oil composition made with the same microwave system as the microwave sub-system of the invention but with unprocessed organic-carbon-containing feedstock and some embodiments at least 0.10 less.

Also, as a result of the above changes, the processed pyrolysis oil has less undesirable impurities such as higher molecular weight tar than the pyrolysis oil made with a similar microwave system but using unprocessed organic-carbon-containing feedstock. Because of the even more uniform conditions in an oxygen-starved atmosphere than with unprocessed organic-carbon-containing feedstock in a microwave system similar to that of the microwave subsystem of the invention, the pyrolysis oil contains fewer char particles than pyrolysis oil made with the same feedstock by an IR process. Some embodiments of the processed pyrolysis oil of the invention have at least 30 percent by weight less tar, some embodiments have at least 40 percent less, some embodiments have at least 50 percent less, and some embodiments have at least 60 percent less. The tar is less because there is less tar created because of a removal water-soluble salts rather than more tar is removed.

Unprocessed Organic-Carbon-Containing Feedstock

Cellulose bundles, interwoven by hemicellulose and lignin polymer strands, are the stuff that makes plants strong and proficient in retaining moisture. Cellulose has evolved over several billion years to resist being broken down by heat, chemicals, or microbes. In a plant cell wall, the bundles of cellulose molecules in the microfibrils provide the wall with tensile strength. The tensile strength of cellulose microfibrils is as high as 110 kg/mm$^2$, or approximately 2.5 times that of the strongest steel in laboratory conditions. When cellulose is wetted, as in the cell walls, its tensile strength declines rapidly, significantly reducing its ability to provide mechanical support. But in biological systems, the cellulose skeleton is embedded in a matrix of pectin, hemicellulose, and lignin that act as waterproofing and strengthening material. That makes it difficult to produce fuels from renewable cellulose-containing biomass fast enough, cheap enough, or on a large enough scale to make economical sense. As used herein, organic-carbon-containing material means renewable plant-containing material that can be renewed in less than 50 years and includes plant material such as, for example herbaceous materials such as grasses, energy crops, and agricultural plant waste; woody materials such as tree parts, other woody waste, and discarded items made from wood such as broken furniture and railroad ties; and animal material containing undigested plant cells such as animal manure. Organic-carbon-containing material that is used as a feedstock in a process is called an organic-carbon-containing feedstock Unprocessed organic-carbon-containing material, also referred to as renewable biomass, encompasses a wide array of organic materials as stated above. It is estimated that the U.S. alone generates billions of tons of organic-carbon-containing material annually. As used in this document, beneficiated organic-carbon-containing feedstock is processed organic-carbon-containing feedstock where the moisture content has been reduced, a significant amount of dissolved salts have been removed, and the energy density of the material has been increased. This processed feedstock can be used as input for processes that make several energy-producing products, including, for example, liquid hydrocarbon fuels, solid fuel to supplant coal, and synthetic natural gas.

As everyone in the business of making organic-carbon-containing feedstock is reminded, the energy balance is the metric that matters most. The amount of energy used to beneficiate organic-carbon-containing feedstock and, thus, the cost of that energy must be substantially offset by offset by the overall improvement realized by the beneficiation process in the first place. For example, committing 1000 BTU to improve the heat content of the processed organic-carbon-containing feedstock by 1000 BTU, all other things being equal, does not make economic sense unless the concurrent removal of a significant amount of the water-soluble salt renders previously unusable organic-carbon-containing feedstock usable as a fuel substitute for some processes such as boilers.

As used herein, organic-carbon-containing feedstock comprises free water, intercellular water, intracellular water, intracellular water-salts, and at least some plant cells comprising cell walls that include lignin, hemicellulose, and cellulosic microfibrils within fibrils. In some embodiments, the water-soluble salt content of the unprocessed organic-carbon-containing feedstock is at least 4000 mg/kg on a dry basis. In other embodiments the salt content may be more than 1000 mg/kg, 2000 mg/kg, or 3000 mg/kg. The content is largely dependent on the soil where the organic-carbon-containing material is grown. Regions that are land rich and more able to allow land use for growing energy crops in commercial quantities often have alkaline soils that result in organic-carbon-containing feedstock with water-soluble salt content of over 4000 mg/kg.

Water-soluble salts are undesirable in processes that use organic-carbon-containing feedstock to create fuels. The salt tends to shorten the operating life of equipment through corrosion, fouling, or slagging when combusted. Some boilers have standards that limit the concentration of salt in fuels to less than 1500 mg/kg. This is to find a balance between availability of fuel for the boilers and expense of frequency of cleaning the equipment and replacing parts. If economical, less salt would be preferred. In fact, salt reduction through beneficiation is an enabling technology for the use of salt-laden biomass (e.g. hog fuels, mesquite, and pinyon-junipers) in boilers. Salt also frequently poisons catalysts and inhibits bacteria or enzyme use in processes used for creating beneficial fuels. While some salt concentration is tolerated, desirably the salt levels should be as low as economically feasible.

The water-soluble salt and various forms of water are located in various regions in plant cells. As used herein, plant cells are composed of cell walls that include cellulosic microfibril bundles within fibrils and include intracellular water and intracellular water-soluble salt. FIG. 1 is a diagram of a typical plant cell with an exploded view of a region of its cell wall showing the arrangement of fibrils, microfibrils, and cellulose in the cell wall. A plant cell (100) is shown with a section of cell wall (120) magnified to show a fibril (130). Each fibril is composed of microfibrils (140) that include strands of cellulose (150). The strands of cellulose pose some degree of ordering and hence crystallinity.

Figure 2:
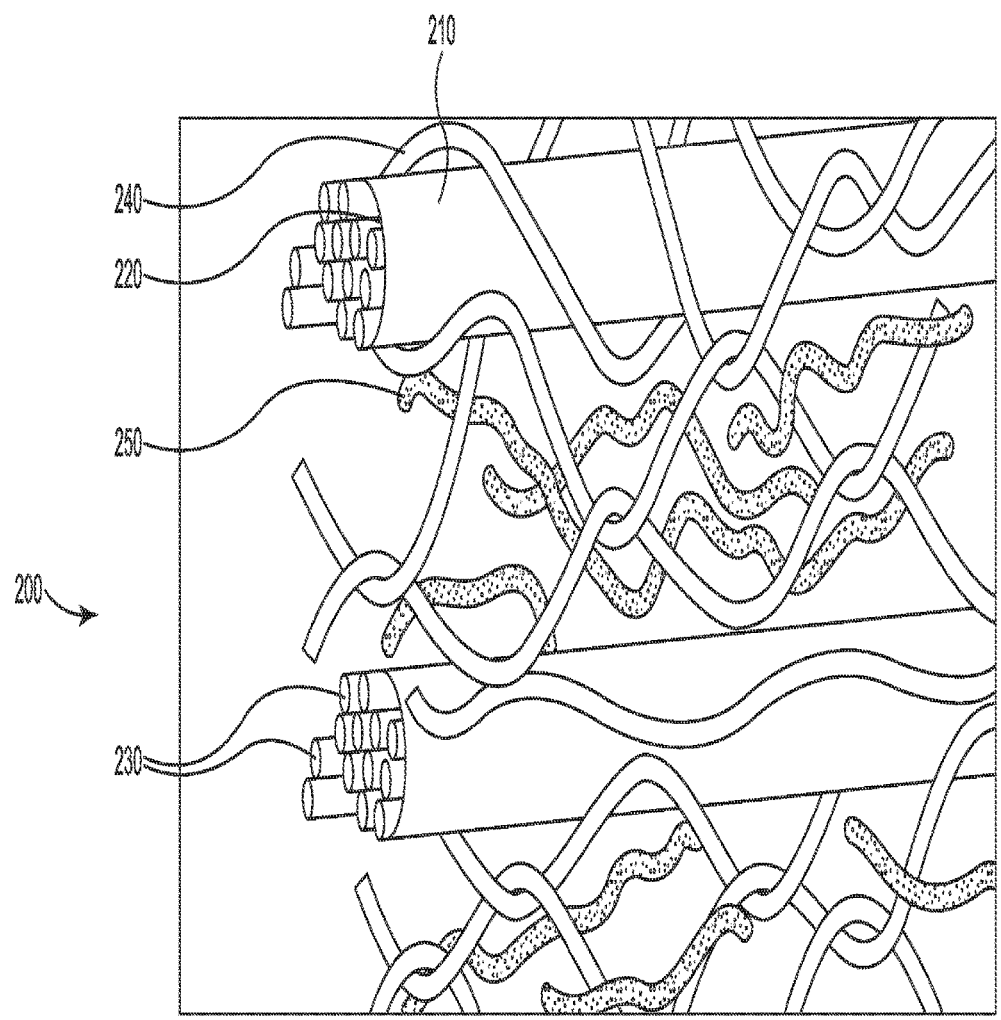
FIG. 2 is a diagram of a perspective side view of a part of two fibrils in a secondary plant cell wall showing fibrils containing microfibrils and connected by strands of hemicellulose, and lignin

Plant cells have a primary cell wall and a secondary cell wall. The secondary cell wall varies in thickness with type of plant and provides most of the strength of plant material. FIG. 2 is a diagram of a perspective side view of a part of two fibrils bundled together in a secondary plant cell wall showing the fibrils containing microfibrils and connected by strands of hemicellulose, and lignin. The section of plant cell wall (200) is composed of many fibrils (210). Each fibril 210 includes a sheath (220) surrounding an aggregate of cellulosic microfibrils (230). Fibrils 210 are bound together by interwoven strands of hemicellulose (240) and lignin (250). In order to remove the intracellular water and intracellular water-soluble salt, sections of cell wall 200 must be punctured by at least one of unbundling the fibrils from the network of strands of hemicellulose 240 and lignin 250, decrystallizing part of the strands, or depolymerizing part of the strands.

The plant cells are separated from each other by intercellular water. An aggregate of plant cells are grouped together in plant fibers, each with a wall of cellulose that is wet on its outside with free water also known as surface moisture. The amount of water distributed within a specific organic-carbon-containing feedstock varies with the material. As an example, water is distributed in fresh bagasse from herbaceous plants as follows: about 50 wt % intracellular water, about 30 wt % intercellular water, and about 20 wt % free water.

Figure 3:
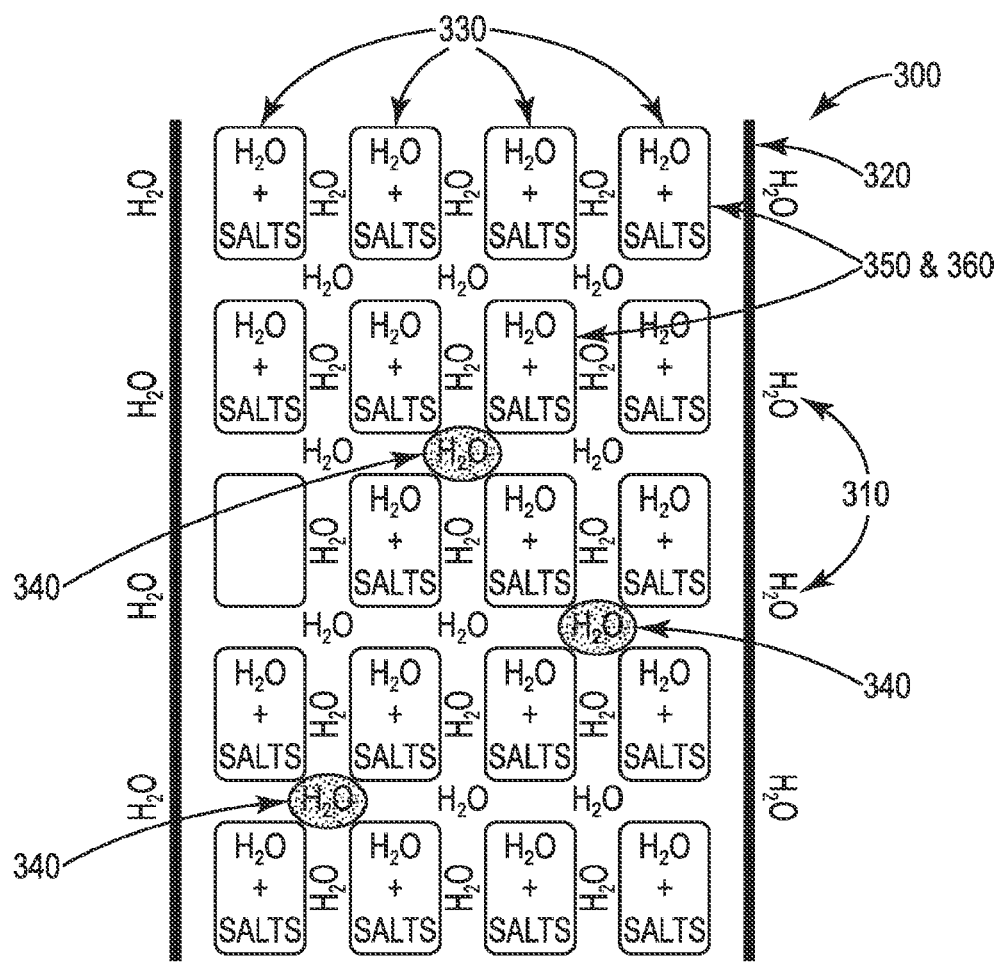
FIG. 3 is a diagram of a cross-sectional view of a section of bagasse fiber showing where water and water-soluble salts reside inside and outside plant cells.

FIG. 3 is diagram of a cross-sectional view of a fiber section of bagasse showing where water and water-soluble salts reside inside and outside plant cells. A fiber with an aggregate of plant cells (300) is shown with surface moisture (310) on the outer cellulosic wall (320). Within fiber 300 lays individual plant cells (330) separated by intercellular water (340). Within each individual plant cell 330 lays intracellular water (350) and intracellular water-soluble salt (360).

Conventional methods to beneficiate organic-carbon-containing feedstock include thermal processes, mechanical processes, and physiochemical processes. Thermal methods include heat treatments that involve pyrolysis and torrefaction. The thermal methods do not effectively remove entrained salts and only serve to concentrate them. Thus thermal processes are not acceptable for the creation of many energy creating products such as organic-carbon-containing feedstock used as a fuel substitute to the likes of coal and petroleum. Additionally, all conventional thermal methods are energy intensive, leading to an unfavorable overall energy balance, and thus economically limiting in the commercial use of organic-carbon-containing feedstock as a renewable source of energy.

The mechanical method, also called pressure extrusion or densification, can be divided into two discrete processes where water and water-soluble salts are forcibly extruded from the organic-carbon-containing material. These two processes are intercellular and intracellular extrusion. The extrusion of intercellular water and intercellular water-soluble salt occurs at a moderate pressure, depending upon the freshness of the organic-carbon-containing material, particle size, initial moisture content, and the variety of organic-carbon-containing material. Appropriately sized particles of freshly cut herbaceous organic-carbon-containing feedstock with moisture content between 50 wt % and 60 wt % will begin extruding intercellular moisture at pressures as low as 1,000 psi and will continue until excessive pressure forces the moisture into the plant cells (essentially becoming intracellular moisture).

As the densification proceeds, higher pressures, and hence higher energy costs, are required to try to extrude intracellular water and intracellular water-soluble salt. However, stiff cell walls provide the biomass material with mechanical strength and are able to withstand high pressures without loss of structural integrity. In addition, the formation of impermeable felts more prevalent in weaker cell walled herbaceous material has been observed during compaction of different herbaceous biomass materials above a threshold pressure. This method is energy intensive. In addition, it can only remove up to 50 percent of the water-soluble salts on a dry basis (the intracellular salt remains) and is unable to reduce more than the water content to below 30 wt percent.

The felts are formed when long fibers form a weave and are bound together by very small particles of pith. Pith is a tissue found in plants and is composed of soft, spongy parenchyma cells, which store and transport water-soluble nutrients throughout the plant. Pith particles can hold 50 times their own weight in water. As the compression forces exerted during the compaction force water into the forming felts, the entrained pith particles collect moisture up to their capacity. As a result, the moisture content of any felt can approach 90%. When felts form during compaction, regardless of the forces applied, the overall moisture content of the compacted biomass will be substantially higher than it would have been otherwise had the felt not formed. The felt blocks the exit ports of the compaction device as well as segments perpendicular to the applied force, and the water is blocked from expulsion from the compaction device. The felt also blocks water passing through the plant fibers and plant cells resulting in some water passing back through cell wall pores into some plant cells. In addition, it can only remove up to 50 percent of the water-soluble salts on a dry basis and is unable to reduce more than the water content to below 30 wt percent.

The physiochemical method involves a chemical pretreatment of organic-carbon-containing feedstock and a pressure decompression prior to compaction to substantially improve the quality of densified biomass while also reducing the amount of energy required during compaction to achieve the desired bulk density. Chemically, biomass comprises mostly cellulose, hemicellulose, and lignin located in the secondary cell wall of relevant plant materials. The strands of cellulose and hemicellulose are cross-linked by lignin, forming a lignin-carbohydrate complex (LCC). The LCC produces the hydrophobic barrier to the elimination of intracellular water. In addition to the paper pulping process that solubilizes too much of the organic-carbon-containing material, conventional pre-treatments include acid hydrolysis, steam explosion, AFEX, alkaline wet oxidation, and ozone treatment. All of these processes, if not carefully engineered, can be can be expensive on a cost per product weight basis and are not designed to remove more than 25% water-soluble salt on a dry weight basis.

In addition, the energy density generally obtainable from an organic-carbon-containing material is dependent on its type, i.e., herbaceous, soft woody, and hard woody. Also mixing types in subsequent uses such as fuel for power plants is generally undesirable because the energy density of current processed organic-carbon-containing feedstock varies greatly with type of plant material.

As stated above, plant material can be further subdivided in to three sub classes, herbaceous, soft woody and hard woody, each with particular water retention mechanisms. All plant cells have a primary cell wall and a secondary cell wall. As stated earlier, the strength of the material comes mostly from the secondary cell wall, not the primary one. The secondary cell wall for even soft woody materials is thicker than for herbaceous material.

Herbaceous plants are relatively weak-walled plants, include corn, and have a maximum height of less than about 10 to 15 feet (about 3 to 5 meters (M)). While all plants contain pith particles, herbaceous plants retain most of their moisture through a high concentration of pith particles within the plant cells that hold water like balloons because these plants have relatively weak cell walls. Pressure merely deforms the balloons and does not cause the plant to give up its water. Herbaceous plants have about 50% of their water as intracellular water and have an energy density of unprocessed material at about 5.2 million BTUs per ton (MMBTU/ton) or 6 gigajoules per metric ton (GJ/MT). By comparison, pure carbon in the form of graphite has an energy density of 28 MMBTU/ton (33 GJ/MT) and, anthracite coal has an energy density of about 21 MMBTU/ton (25 GJ/MT)

Soft woody materials are more sturdy plants than herbaceous plants. Soft woody materials include pines and typically have a maximum height of between 50 and 60 feet (about 15 and 18 M). Their plant cells have stiffer walls and thus need less pith particles to retain moisture. Soft woody materials have about 50% of their water as intracellular water and have an energy density of about 13-14 MMBTU/ton (15-16 GJ/MT).

Hard woody materials are the most sturdy of plants, include oak, and typically have a maximum height of between 60 and 90 feet (18 and 27 M). They have cellulosic plant cells with the thickest secondary cell wall and thus need the least amount of pith particles to retain moisture. Hard woody materials have about 50% of their water as intracellular water and have an energy density of about 14-15 MMBTU/ton (16-18 GJ/MT).

There is a need in the energy industry for a system and method to allow the energy industry to use organic-carbon-containing material as a commercial alternative or adjunct fuel source. Much of the land available to grow renewable organic-carbon-containing material on a commercial scale also results in organic-carbon-containing material that has a higher than desired content of water-soluble salt that typically is at levels of at least 4000 mg/kg. Forest products in the Pacific Northwest are often transported via intracoastal waterways, exposing the biomass to salt from the ocean. Thus such a system and method must be able to remove sufficient levels of water-soluble salt to provide a suitable fuel substitute. As an example, boilers generally need salt contents of less than 1500 mg/kg to avoid costly maintenance related to high salt in the fuel. In addition, the energy and resulting cost to remove sufficient water to achieve an acceptable energy density must be low enough to make the organic-carbon-containing material feedstock a suitable alternative in processes to make coal or hydrocarbon fuel substitutes.

There is also a need for a process that can handle the various types of plants and arrive at processed organic-carbon-containing feedstock with similar energy densities.

The invention disclosed does allow the energy industry to use processed organic-carbon-containing material as a commercial alternative fuel source. Some embodiments of the invention remove almost all of the chemical contamination, man-made or natural, and lower the total water content to levels in the range of 5 wt % to 15 wt %. This allows the industries, such as the electric utility industry to blend the organic-carbon-containing feedstock on a ratio of up to 50 wt % processed organic-carbon-containing feedstock to 50 wt % coal with a substantial reduction in the amount of water-soluble salt and enjoy the same MMBTU/ton (GJ/MT) efficiency as coal at coal competitive prices. Literature has described organic-carbon-containing feedstock to coal ratios of up to 30%. A recent patent application publication, EP2580307 A2, has described a ratio of up to 50% by mechanical compaction under heat, but there was no explicit reduction in water-soluble salt content in the organic-carbon-containing feedstock. The invention disclosed herein explicitly comprises substantial water-soluble salt reduction through a reaction chamber with conditions tailored to each specific unprocessed organic-carbon-containing feedstock used. As discussed below, additional purposed rinse subsections and subsequent pressing algorithms in the compaction section of the Reaction Chamber may be beneficial to process organic-carbon-containing feedstock that has a particularly high content of water-soluble salt so that it may be used in a blend with coal that otherwise would be unavailable for burning in a coal boiler. This also includes, for example, hog fuel, mesquite, and Eastern red cedar.

In addition, the invention disclosed does permit different types of organic-carbon-containing feedstock to be processed, each at tailored conditions, to result in processed outputs having preselected energy densities. In some embodiments of the invention, more than one type of feedstock with different energy densities that range from 5.2 to 14 MMBTU/ton (6 to 16 GJ/MT) may be fed into the reaction chamber in series or through different reaction chambers in parallel. Because each type of organic-carbon-containing feedstock is processed under preselected tailored conditions, the resulting processed organic-carbon-containing feedstock for some embodiments of the system of the invention can have a substantially similar energy density. In some embodiments, the energy density is about 17 MMBTU/ton (20 GJ/MT). In others it is about 18, 19, or 20 MMBTU/ton (21, 22, or 23 GJ/MT). This offers a tremendous advantage for down-stream processes to be able to work with processed organic-carbon-containing feedstock having similar energy density regardless of the type used as well as substantially reduced water-soluble content.

The process of the invention uses a beneficiation subsystem to create the processed organic-carbon-containing feedstock that is a clean economical material to be used for creating a satisfactory coal substitute solid fuel from renewable biomass and a microwave subsystem for converting the processed organic-carbon-containing feedstock into the solid fuel char of the invention. The first subsystem will now be discussed.

Beneficiation Sub-System

The Beneficiation sub-system is used to make processed organic-carbon-containing feedstock comprises at least three elements, a transmission device, at least one reaction chamber, and a collection device. As used in this document, the beneficiation sub-system refers to the system that is used to convert unprocessed organic-carbon-containing feedstock into processed organic-carbon-containing feedstock.

The first element, the transmission device, is configured to convey into a reaction chamber unprocessed organic-carbon-containing feedstock comprising free water, intercellular water, intracellular water, intracellular water-soluble salt, and at least some plant cells comprising cell walls that include lignin, hemicellulose, and cellulosic microfibrils within fibrils. The transmission device may be any that is suitable to convey solid unprocessed organic-carbon-containing feedstock into the reaction chamber to obtain a consistent residence time of the feedstock in the reaction chamber. The transmission devices include such devices at augers that are well known in the chemical industry.

Particle size of the unprocessed organic-carbon-containing feedstock should be sufficiently small to permit a satisfactorily energy balance as the unprocessed organic-carbon-containing feedstock is passed through the system to create processed organic-carbon-containing feedstock. In some embodiments, the unprocessed organic-carbon-containing feedstock arrives at some nominal size. Herbaceous material such as, for example, energy crops and agricultural waste, should have a particle size where the longest dimension is less than 1 inch (2.5 cm). Preferably, most wood and wood waste that is freshly cut should have a longest length of less than 0.5 inches (1.3 cm). Preferably, old wood waste, especially resinous types of wood such as, for example pine, has a particle size with a longest dimension of less than 0.25 inches (about 0.6 cm) to obtain the optimum economic outcome, where throughput and energy/chemical consumption are weighed together.

Some embodiments of the system may also include a mastication chamber before the reaction chamber. This mastication chamber is configured to reduce particle size of the organic-carbon-containing feedstock to less than 1 inch (2.5 cm) as the longest dimension. This allows the organic-carbon-containing feedstock to arrive with particle sized having a longest dimension larger than 1 inch (2.5 cm).

Some embodiments of the system may also include a pretreatment chamber to remove contaminants that hinder creation of the passageways for intracellular water and water-soluble salts to pass from the cellulosic-fibril bundles. The chamber is configured to use for each organic-carbon-containing feedstock a particular set of conditions including time duration, temperature profile, and chemical content of pretreatment solution to at least initiate the dissolution of contaminates. The contaminants include resins, rosins, glue, and creosote. The solid slurry, including any incipient felts, may be collected for use as binders in the processed organic-carbon-containing feedstock that is the primary end product. Separate oils may be collected as a stand-alone product such as, for example, cedar oil.

The second element, the reaction chamber, includes at least one entrance passageway, at least one exit passageway, and at least three sections, a wet fibril disruption section, a vapor explosion section, and a compaction section. The first section, the wet fibril disruption section, is configured to break loose at least some of the lignin and hemicellulose between the cellulosic microfibrils in the fibril bundle to make at least some regions of cell wall more penetrable. This is accomplished by at least one of several means. The organic-carbon-containing feedstock is mixed with appropriate chemicals to permeate the plant fibrils and disrupt the lignin, hemicellulose, and LCC barriers. Additionally, the chemical treatment may also unbundle a portion of the cellulose fibrils and/or microfibrils, de-crystallizing and/or depolymerizing it. Preferably, the chemicals are tailored for the specific organic-carbon-containing feedstock. In some embodiments, the chemical treatment comprises an aqueous solution containing a miscible volatile gas. The miscible gas may include one or more of ammonia, bicarbonate/carbonate, or oxygen. Some embodiments may include aqueous solutions of methanol, ammonium carbonate, or carbonic acid. The use of methanol, for example, may be desirable for organic-carbon-containing feedstock having a higher woody content to dissolve resins contained in the woody organic-carbon-containing feedstock to allow beneficiation chemicals better contact with the fibrils. After a predetermined residence time of mixing, the organic-carbon-containing feedstock may be steam driven, or conveyed by another means such as a piston, into the next section of the reaction chamber. In some embodiments, process conditions should be chosen to not dissolve more than 25 wt % of the lignin or hemicellulose as these are important contributors to the energy density of the processed organic-carbon-containing feedstock. Some embodiments of the system, depending on the specific organic-carbon-containing feedstock used, may have temperatures of at least 135° C., at least 165° C., or at least 180° C.; pressures of at least 260 psig, at least 280 psig, at least 375 psig, or at least 640 psig; and residence times of at least 15 minutes (min), 20 min, or 30 min.

The second section, the vapor explosion section, is in communication with the wet fibril disruption section. It at least is configured to volatilize plant fibril permeable fluid through rapid decompression to penetrate the more susceptible regions of the cell wall so as to create a porous organic-carbon-containing feedstock with cellulosic passageways for intracellular water and water-soluble salts to pass from the cellulosic-fibril bundles. The organic-carbon-containing feedstock is isolated, heated, pressurized with a volatile fluid comprising steam. The applied volatile chemicals and steam penetrate into the plant fibrils within the vapor explosion section due to the high temperature and pressure. After a predetermined residence time dictated by the specific organic-carbon-containing feedstock used, pressure is released rapidly from the reaction chamber by opening a fast-opening valve into an expansion chamber that may be designed to retain the gases, separate them, and reuse at least some of them in the process for increased energy/chemical efficiency. Some embodiments may have no expansion chamber where retention of gasses is not desired. Some embodiments of the system, depending on the specific organic-carbon-containing feedstock used, may have a specific pressure drop in psig of at least 230, at least 250, at least 345, or at least 600; and explosive durations of less than 500 milliseconds (ms), less than 300 ms, less than 200 ms, less than 100 ms, or less than 50 ms.

Some embodiments may include gas inlets into the wet fibril disruption section of the reaction chamber to deliver compressed air or other compressed gas such as, for example, oxygen. After delivery to the desired pressure, the inlet port would be closed and the heating for the reaction would proceed. Note that this could allow for at least one of three things: First, an increase in total pressure would make subsequent explosion more powerful. Second, an increase in oxygen content would increase the oxidation potential of the processed organic-carbon-containing feedstock where desirable. Third, a provision would be provided for mixing of organic-carbon-containing feedstock, water, and potentially other chemicals such as, for example, organic solvents, through bubbling action of gas through a perforated pipe at bottom of reaction chamber.

The net effect on the organic-carbon-containing feedstock of passing through the wet fibril disruption section and the vapor explosion section is the disruption of fibril cell walls both physically through pressure bursts and chemically through selective and minimal fibril cellulosic delinking, cellulose depolymerization and/or cellulose decrystallization. Chemical effects, such as hydrolysis of the cellulose, lignin, and hemicellulose also can occur. The resulting organic-carbon-containing feedstock particles exhibit an increase in the size and number of micropores in their fibrils and cell walls, and thus an increased surface area. The now porous organic-carbon-containing feedstock is expelled from the vapor explosion section into the next section.

The third section, the compaction section is in communication with the vapor explosion section. The compression section at least is configured to compress the porous organic-carbon-containing feedstock between pressure plates configured to minimize formation of felt that would close the reaction chamber exit passageway made to permit escape of intracellular and intercellular water, and intracellular and intercellular soluble salts. In this section, the principle process conditions for each organic-carbon-containing feedstock is the presence or absence of a raised pattern on the pressure plate, the starting water content, the processed water content, and final water content. The compaction section of the system of the invention requires a raised patterned surface on the pressure plates for feedstock comprising herbaceous plant material feedstock. However, the section may or may not require the raised pattern surface for processing soft woody or hard woody plant material feedstock depending on the specific material used and its freshness from harvest. Some embodiments of the system, depending on the specific organic-carbon-containing feedstock used, may have a starting water contents ranging from 70 to 80 wt %, from 45 to 55 wt % or from 40 to 50 wt %; and processed water content of from 4 to 15 wt % depending on actual targets desired.

The third element, the collection device, is in communication with the reaction chamber. The collection chamber at least is configured to separate non-fuel components from fuel components and to create a processed organic-carbon-containing feedstock. This feedstock has a water content of less than 20 wt % and a water-soluble salt content that is decreased by at least 60% on a dry basis. Some embodiments have the water content less than 20 wt % after allowing for surface moisture to air dry. Some embodiments have a processed organic-carbon-containing feedstock that has a water content of less than 15 wt %. Other embodiments have processed organic-carbon-containing feedstock that has a water content of less than 12 wt %, less than 10 wt %, less than 8 wt %, or less than 5 wt %. Some embodiments have a water-soluble salt content that is decreased by at least 65% on a dry basis. Other embodiments have a water-soluble salt content that is decreased by at least 70% on a dry basis, 75% on a dry basis, at least 80% on a dry basis, at least 85% on a dry basis, at least 90% on a dry basis, or at least 95% on a dry basis.

Some embodiments of the system may further include at least one rinsing subsection. This subsection is configured to flush at least some of the water-soluble salt from the porous organic-carbon-containing feedstock before it is passed to the compaction section. In some embodiments where the salt content is particularly high, such as brine-soaked hog fuel (wood chips, shavings, or residue from sawmills or grinding machine used to create it and also known as "hammer hogs"), the system is configured to have more than one rinsing subsection followed by another compaction section. The separated water, complete with dissolved water soluble salts, may be collected and treated for release into the surrounding environment or even reused in the field that is used to grow the renewable organic-carbon-containing feedstock. The salts in this water are likely to include constituents purposefully added to the crops such as fertilizer and pesticides.

Figure 4:
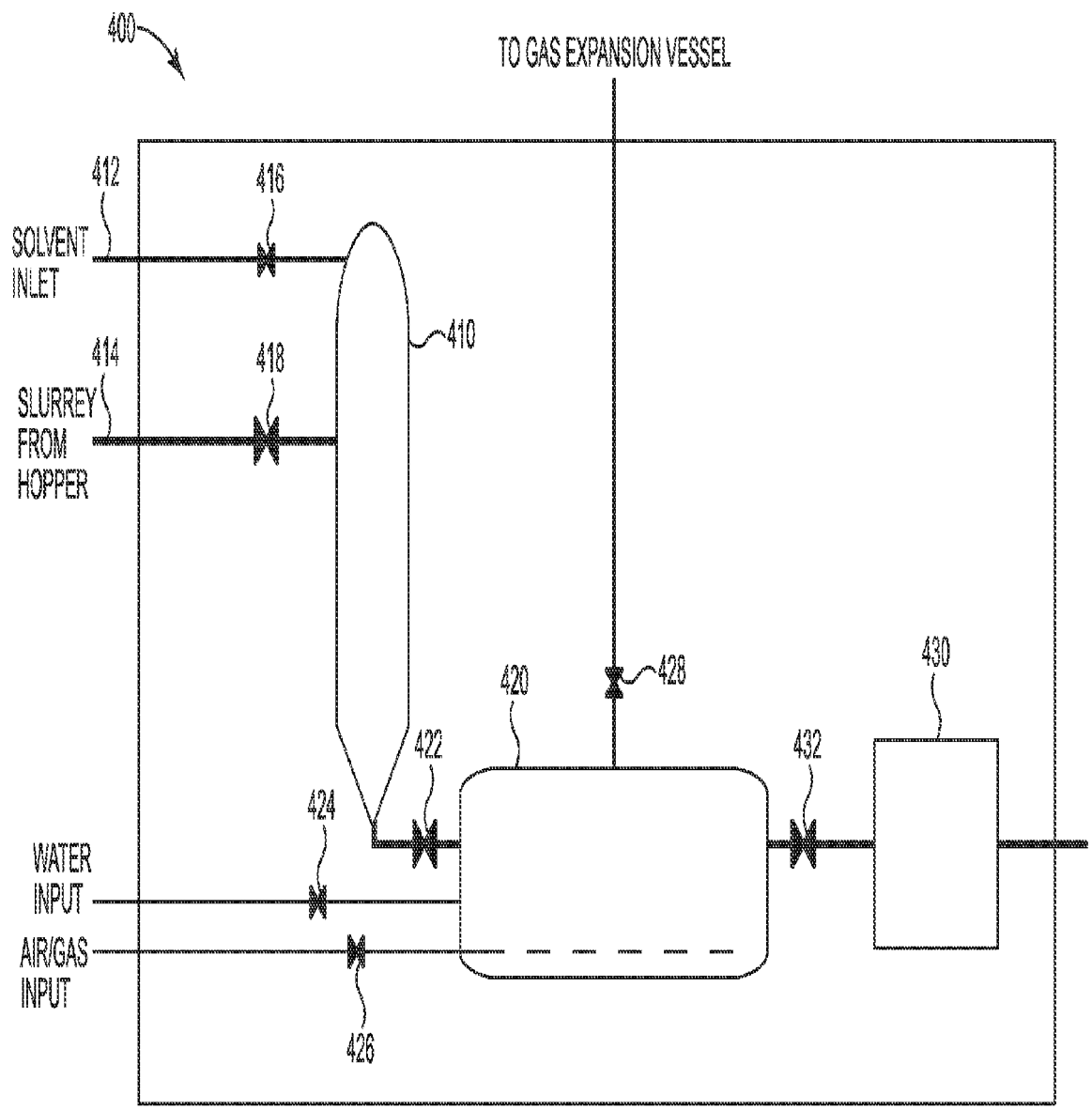
FIG. 4 is a diagram of a side view of an embodiment of a reaction chamber in a beneficiation sub-system.

The beneficiation sub-system of the invention can better be understood through depiction of several figures. FIG. 4 is a diagram of a side view of an embodiment of a reaction chamber in communication with an expansion chamber to retain gasses emitted from the decompressed carbon-containing feedstock. A reaction chamber (400) is shown with a wet fibril disruption section (410). Solvent (412) and unprocessed organic-carbon-containing feedstock (414) are fed in to wet fibril disruption section 410 through valves (416) and (418), respectively to become prepared for the next section. The pretreated organic-carbon-containing feedstock is then passed to a vapor explosion section (420) through a valve (422). Valves are used between chambers and to input materials to allow for attainment of specified targeted conditions in each chamber. Volatile expansion fluid, such as water, or water based volatile mixtures, are fed in to vapor expansion chamber 420 through a valve (424). The gas released from the porous organic-carbon-containing feedstock created during decompression is fed through a fast release valve (428) into an expansion chamber (not shown) to retain the gas for possible reuse. The compaction section (430) received the porous organic-carbon-containing feedstock through a valve (432) where the water and water-soluble salt are substantially removed from porous organic-carbon-containing feedstock and it is now processed organic-carbon-containing feedstock.

Figure 5A:
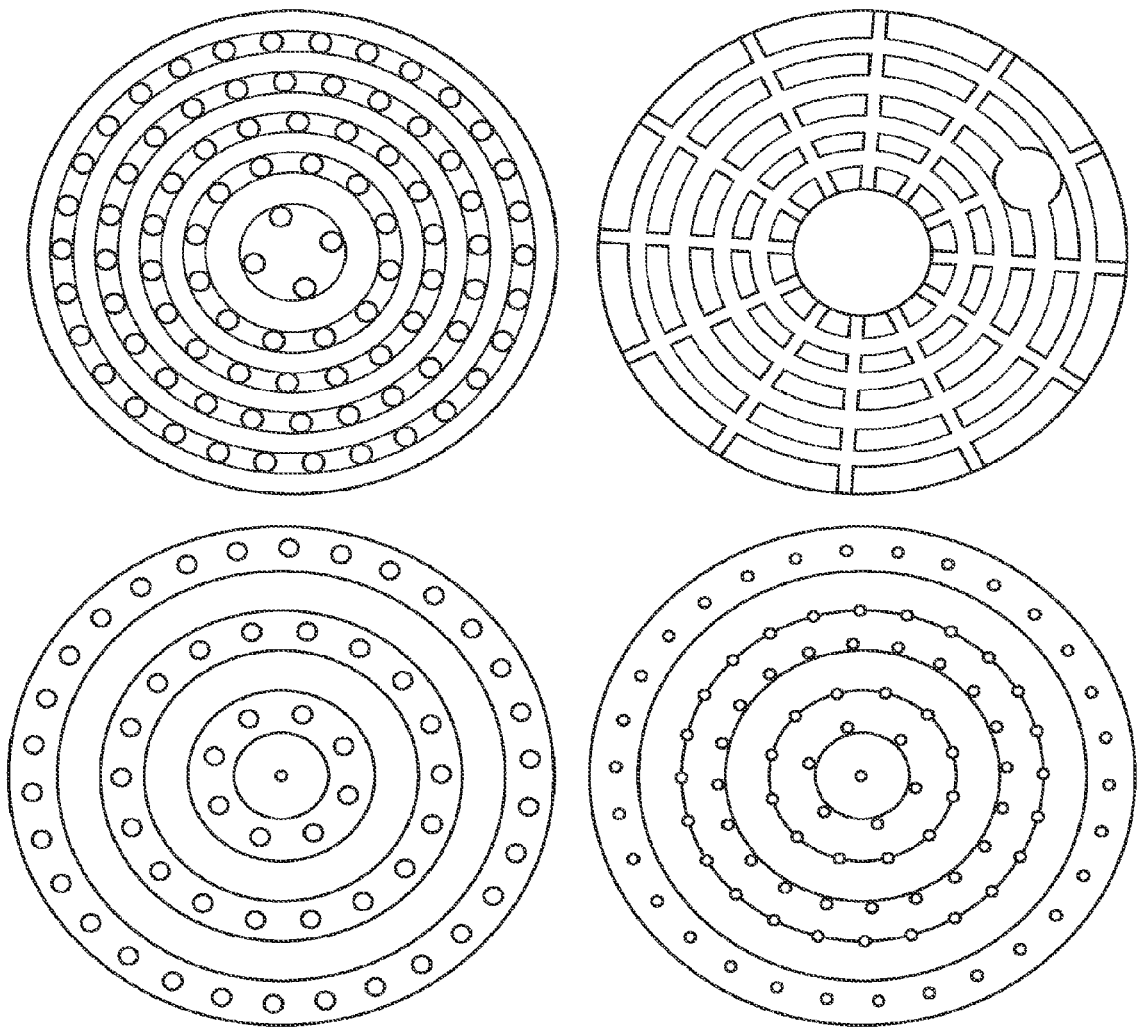
FIG. 5A is a diagram of the front views of various embodiments of pressure plates in a beneficiation sub-system.
Figure 5B:
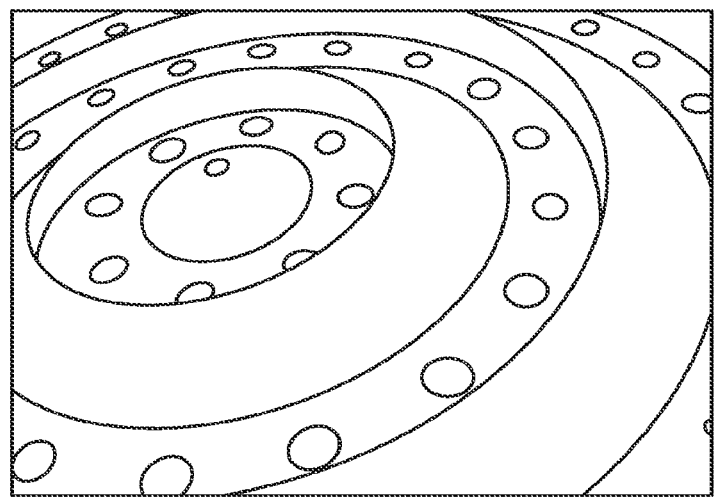
FIG. 5B is a perspective view of a close-up of one embodiment of a pressure plate shown in FIG. 5A.
Figure 5C:
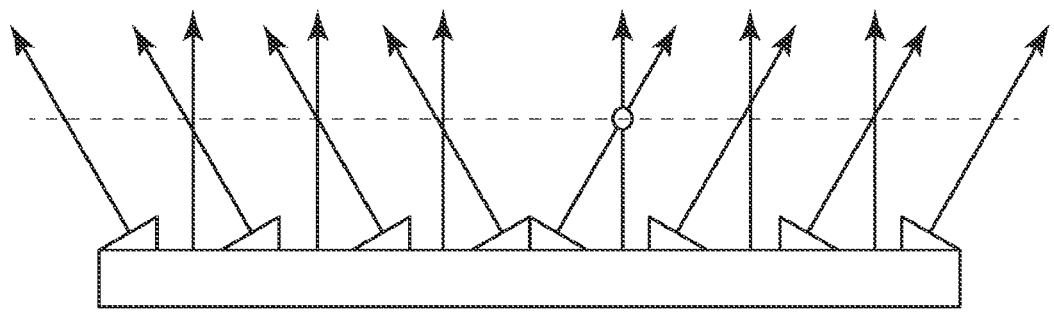
FIG. 5C is a diagram showing the cross-sectional view down the center of a pressure plate with fluid vectors and a particle of pith exposed to the fluid vectors.

As stated above, the pressure plates in the compaction section are configured to minimize felt formation. Felt is an agglomeration of interwoven fibers that interweave to form an impermeable barrier that stops water and water-soluble salts entrained in that water from passing through the exit ports of the compaction section. Additionally, any pith particles that survived the beneficiation process in the first two sections of reaction chamber can be entrained in the felt to absorb water, thereby preventing expulsion of the water during pressing. Therefore, felt formation traps a significant fraction of the water and salts from being extruded from the interior of biomass being compressed. FIGS. 5A, 5B, and 5C show embodiments of pressure plates and how they work to minimize felt formation so that water and water-soluble salts are able to flow freely from the compaction section. FIG. 5A is a diagram of the front views of various embodiments of pressure plates. Shown is the surface of the pressure plate that is pressed against the downstream flow of porous organic-carbon-containing feedstock. FIG. 5B is a perspective view of a close-up of one embodiment of a pressure plate shown in FIG. 5A. FIG. 5C is a diagram showing the cross-sectional view down the center of a pressure plate with force vectors and felt exposed to the force vectors. The upstream beneficiation process in the first two sections of the reaction chamber has severely weakened the fibers in the biomass, thereby also contributing to the minimization of felt formation.

Some embodiments achieve the processed organic-carbon-containing feedstock water content and water-soluble salt reduction over unprocessed organic-carbon-containing feedstock with a cost that is less than 60% that of the cost per weight of processed organic-carbon-containing feedstock from known mechanical, known physiochemical, or known thermal processes. In these embodiments, the reaction chamber is configured to operate at conditions tailored for each unprocessed organic-carbon-containing feedstock and the system is further engineered to re-capture and reuse heat to minimize the energy consumed to lead to a particular set of processed organic-carbon-containing feedstock properties. The reaction chamber sections are further configured as follows. The wet fibril disruption section is further configured to use fibril disruption conditions tailored for each organic-carbon-containing feedstock and that comprise at least a solvent medium, time duration, temperature profile, and pressure profile for each organic-carbon-containing feedstock. The second section, the vapor explosion section, is configured to use explosion conditions tailored for each organic-carbon-containing feedstock and that comprise at least pressure drop, temperature profile, and explosion duration to form volatile plant fibril permeable fluid explosions within the plant cells. The third section, the compaction section, is configured to use compaction conditions tailored for each organic-carbon-containing feedstock and pressure, pressure plate configuration, residence time, and pressure versus time profile.

Figure 6A:
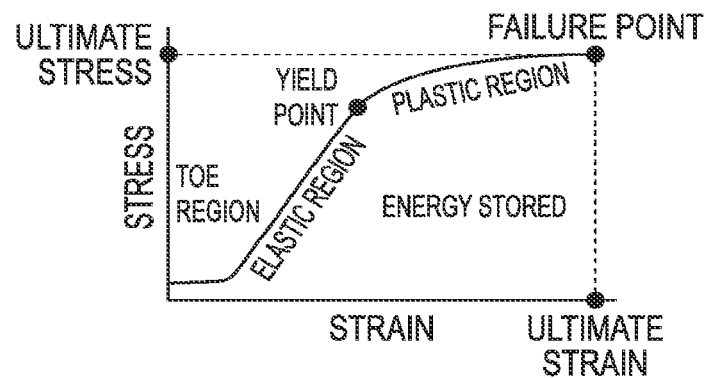
FIG. 6A is a graphical illustration of the typical stress-strain curve for lignocellulosic fibril.

The importance of tailoring process conditions to each organic-carbon-containing feedstock is illustrated by the following discussion on the viscoelastic/viscoplastic properties of plant fibrils. Besides the differences among plants in their cell wall configuration, depending on whether they are herbaceous, soft woody or hard woody, plants demonstrate to a varying degree of some interesting physical properties. Organic-carbon-containing material demonstrates both elastic and plastic properties, with a degree that depends on both the specific variety of plant and its condition such as, for example, whether it is fresh or old. The physics that governs the elastic/plastic relationship of viscoelastic/viscoplastic materials is quite complex. Unlike purely elastic substances, a viscoelastic substance has an elastic component and a viscous component. Similarly, a viscoplastic material has a plastic component and a viscous component. The speed of pressing a viscoelastic substance gives the substance a strain rate dependence on the time until the material's elastic limit is reached. Once the elastic limit is exceeded, the fibrils in the material begin to suffer plastic, i.e., Permanent, deformation. FIG. 6A is a graphical illustration of the typical stress-strain curve for lignocellulosic fibril. Since viscosity, a critical aspect of both viscoelasticity and viscoplasticity, is the resistance to thermally activated deformation, a viscous material will lose energy throughout a compaction cycle. Plastic deformation also results in lost energy as observed by the fibril's failure to restore itself to its original shape. Importantly, viscoelasticity/viscoplasticity results in a molecular rearrangement. When a stress is applied to a viscoelastic material, such as a particular organic-carbon-containing feedstock, some of its constituent fibrils and entrained water molecules change position and, while doing so, lose energy in the form of heat because of friction. It is important to stress that the energy that the material loses to its environment is energy that is received from the compactor and thus energy that is expended by the process. When additional stress is applied beyond the material's elastic limit, the fibrils themselves change shape and not just position. A "visco"-substance will, by definition, lose energy to its environment in the form of heat.

Figure 6B:
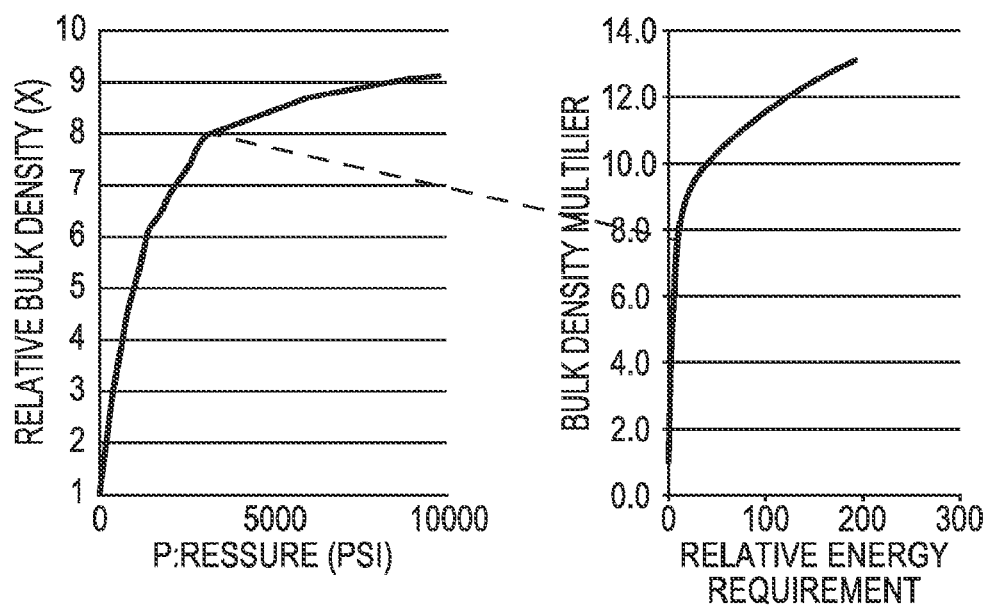
FIG. 6B is a graphical illustration of pressure and energy required to decrease the water content and increase the bulk density of typical organic-carbon-containing feedstock.

An example of how the compaction cycle is optimized for one organic-carbon-containing feedstock to minimize energy consumption to achieve targeted product values follows. Through experimentation, a balance is made between energy consumed and energy density achieved. FIG. 6B is a graphical illustration of pressure and energy required to decrease the water content and increase the bulk density of typical organic-carbon-containing feedstock. Bulk density is related to water content with higher bulk density equaling lower water content. The organic-carbon-containing feedstock compaction process will strike an optimum balance between cycle time affecting productivity, net moisture extrusion together with associated water-soluble salts and minerals, permanent bulk density improvement net of the rebound effect due to viscoelastic/viscoplastic properties of the feedstock, and energy consumption.

Figure 6C:
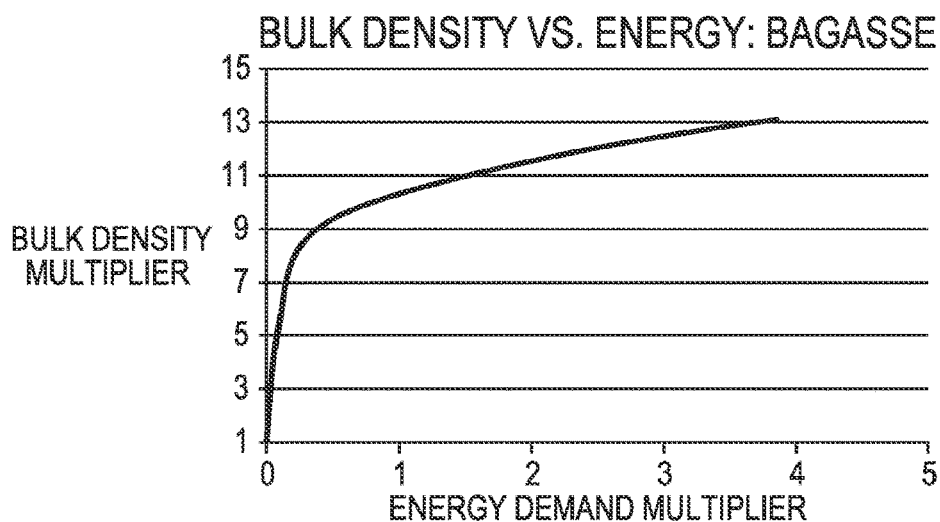
FIG. 6C is a graphical illustration of the energy demand multiplier needed to achieve a bulk density multiplier.
Figure 6D:
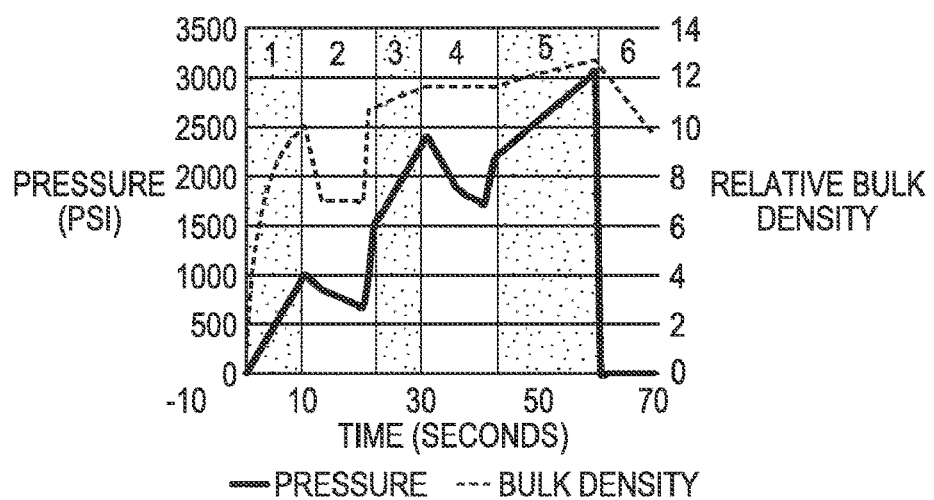
FIG. 6D is a graphical illustration of an example of a pressure cycle for decreasing water content in an organic-carbon-containing feedstock with an embodiment of the invention tailored to a specific the organic-carbon-containing feedstock.

FIG. 6C is an experimentally derived graphical illustration of the energy demand multiplier needed to achieve a bulk density multiplier. The compaction cycle can be further optimized for each variety and condition of organic-carbon-containing feedstock to achieve the desired results at lesser pressures, i.e., energy consumption, by incorporating brief pauses into the cycle. FIG. 6D is a graphical illustration of an example of a pressure cycle for decreasing water content in an organic-carbon-containing feedstock with an embodiment of the invention tailored to a specific the organic-carbon-containing feedstock.

In a similar manner, energy consumption can be optimized during the wet fibril disruption and the vapor explosion parts of the system. Chemical pretreatment prior to compaction will further improve the quality of the product and also reduce the net energy consumption. For comparison purposes, the pressure applied to achieve a bulk density multiplier of "10" in FIG. 6C was on the order of 10,000 psi, requiring uneconomically high cost of capital equipment and unsatisfactorily high energy costs to decompress the organic-carbon-containing feedstock.

FIG. 7 is a table illustrating the estimated energy consumption needed to remove at least 75 wt % water-soluble salt from organic-carbon-containing feedstock and reduce water content from 50 wt % to 12 wt % with embodiments of the invention compared with known processes. Waste wood with a starting water content of 50 wt % was used in the estimate to illustrate a side-by-side comparison of three embodiments of the invention with known mechanical, physiochemical, and thermal processes. The embodiments of the system selected use a fibril swelling fluid comprising water, water with methanol, water with carbon dioxide bubbled into it produces carbonic acid $H_2CO_3$. As seen in the table, and discussed above, known mechanical processes are unable to reduce the water content to 12 wt %, known physiochemical processes are unable to reduce water-soluble salt content by over 25 wt %, and known thermal processes are unable to remove any water-soluble salt. The total energy requirement per ton for the three embodiments of the invention, that using methanol and water, carbon dioxide and water, and just water is 0.28 MMBTU/ton (0.33 GJ/MT), 0.31 MMBTU/ton (0.36 GJ/MT), and 0.42 MMBTU/ton (0.49 GJ/MT), respectively. This is compared to 0.41 MMBTU/ton (0.48 GJ/MT), 0.90 MMBTU/ton (1.05 GJ/MT), and 0.78 MMBTU/ton (0.91 GJ/MT) for known mechanical, known physiochemical, and known thermal processes, respectively. Thus, the estimated energy requirements to remove water down to a content of less than 20 wt % and water-soluble salt by 75 wt % on a dry basis for embodiments of the system invention to less than 60% that of known physiochemical and known thermal processes that are able to remove that much water and water-soluble salt. In addition, the system invention is able to remove far more water-soluble salt than is possible with known physiochemical and known thermal processes that are able to remove that much water.

Figure 8:
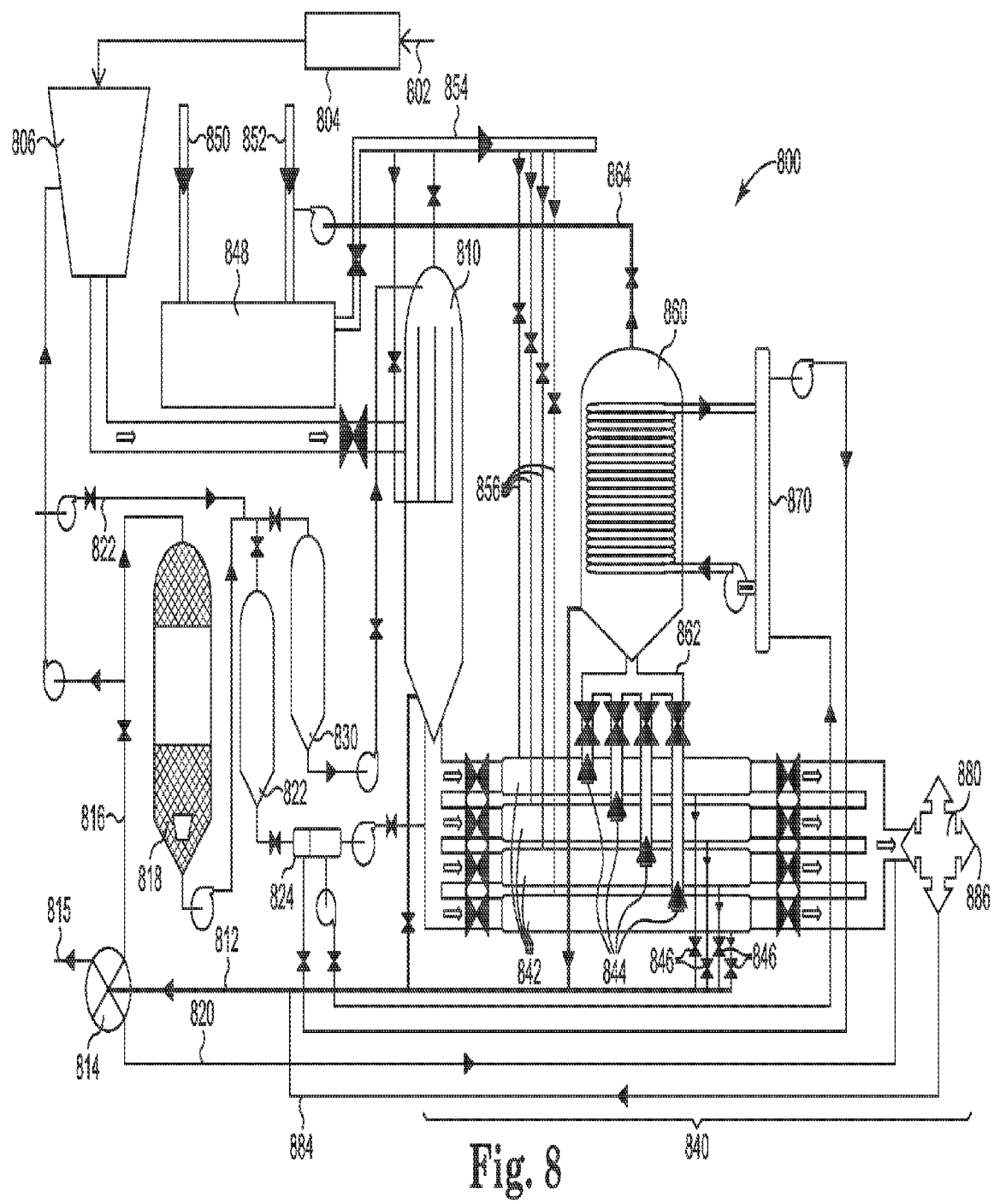
FIG. 8 is a diagram of a side view of an embodiment of a beneficiation sub-system having four reaction chambers in parallel, a pretreatment chamber, and a vapor condensation chamber.

Multiple reaction chambers may be used in parallel to simulate a continuous process. FIG. 8 is a diagram of a side view of an embodiment of a beneficiation sub-system having four reaction chambers in parallel, a pretreatment chamber, and a vapor condensation chamber. A system (800) includes an input section (802) that delivers organic-carbon-containing feedstock to system 800. Feedstock passes through a mastication chamber (804) prior to entry into an organic-carbon-containing feedstock hopper ((806) from where is passes on to a pretreatment chamber (810). Contaminants are removed through a liquid effluent line (812) to a separation device (814) such as a centrifuge and having an exit stream (815) for contaminants, a liquid discharge line (816) that moves liquid to a filter media tank (818) and beyond for reuse, and a solid discharge line (820) that places solids back into the porous organic-carbon-containing feedstock. Liquid from the filter medial tank 818 is passed to a remix tank (822) and then to a heat exchanger (824) or to a second remix tank (830) and to pretreatment chamber 810. The organic-carbon-containing feedstock passes onto one of four reaction chambers (840) comprising three sections. The first section of each reaction chamber, a wet fibril disruption section (842), is followed by the second section, a vapor explosion section (844), and a rinsing subsection (846). A high pressure steam boiler (848) is fed by a makeup water line (850) and the heat source (not shown) is additionally heated with fuel from a combustion air line (852). The main steam line (854) supplies steam to pretreatment chamber 810 and through high pressure steam lines (856) to reaction chambers 840. A vapor expansion chamber (860) containing a vapor condensation loop is attached to each vapor explosion sections with vapor explosion manifolds (862) to condense the gas. A volatile organic components and solvent vapor line (864) passes the vapor back to a combustion air line (852) and the vapors in vapor expansion chamber 860 are passes through a heat exchanger (870) to capture heat for reuse in reaction chamber 840. The now porous organic-carbon-containing feedstock now passes through the third section of reaction chamber 840, a compaction section (880). Liquid fluid passes through the liquid fluid exit passageway (884) back through fluid separation device (814) and solid processed organic-carbon-containing feedstock exits at (886).

Microwave Sub-System

The microwave sub-system is used to convert the processed organic-carbon-containing feedstock from the beneficiation sub-system into the clean liquid processed pyrolysis oil of the invention. The invention comprises a composition made from a processed organic-carbon-containing feedstock that passes through a microwave process sub-system. The sub-system includes at least one reaction chamber within a microwave reflective enclosure and comprising at least one microwave-transparent chamber wall and a reaction cavity configured to hold the processed organic-carbon-containing feedstock in an externally supplied oxygen-free atmosphere. A microwave sub-system includes at least one device configured to emit microwaves when energized. The microwave device is positioned relative to the reaction chamber so that the microwaves are directed through the microwave-transparent chamber wall and into the reaction cavity. The sub-system also includes a mechanism that provides relative motion between the microwave device and the reaction chamber. The processed pyrolysis oil composition includes substantially no free water. Also the processed pyrolysis oil composition includes a number of pores per volume that is at least 10 percent more than would have been in a char made with the same feedstock but using a thermal process that creates a liquid phase during the process. The characteristics of the feedstock and resulting processed pyrolysis oil have already been discussed above. The microwave process used to make the processed pyrolysis oil of the invention is now discussed.

In the following description of the illustrated embodiments, references are made to the accompanying drawings that help to illustrate various embodiments of the microwave process used to make the processed pyrolysis oil of the invention. It is to be understood that other embodiments of the process may be utilized and structural and functional changes may be made without departing from the scope of the present invention.

The following description relates to approaches for processing solid and/or liquid organic-carbon-containing feedstock into fuels, e.g., diesel fuels, gasoline, kerosene, etc., by microwave enhanced reaction deconstruction processes.

Deconstruction, also referred to as "cracking", is a refining process that uses heat to break down (or "crack") hydrocarbon molecules into shorter hydrocarbon chains which are useful as fuels. Deconstruction may be enhanced by adding a catalyst to the feedstock which increases the speed of the reaction and/or reduces the temperature and/or the radiation exposure required for the processes. Furthermore, the catalyst, such as zeolite, has a nanostructure which allows only molecules of a certain size to enter the crystalline grid or activate the surface areas of the catalyst and to interact with the catalyst. Thus, the catalyst advantageously is very effective at controlling the product produced by the reaction processes because only substances having a specified chain length may be produced using the catalytic process. Catalytic deconstruction is particularly useful for transforming biomass and other organic-carbon-containing feedstock into fuels useable as transportation or heating fuels.

One aspect of efficient deconstruction is the ability to heat and irradiate the feedstock substantially uniformly to the temperature that is sufficient to cause deconstruction as well as activate the catalyst. Upon deconstruction, long hydrocarbon chains "crack" into shorter chains. Microwave heating has been shown to be particularly useful in heating systems for thermal deconstruction. Heating systems such as flame, steam, and/or electrical resistive heating, heat the feedstock by thermal conduction through the reaction chamber wall. These heating systems operate to heat the feedstock from the outside of the reaction chamber walls to the inside of the feedstock, whereas microwaves heat uniformly throughout the width of the reaction chamber. Using non-microwave heating sources, the heat is transferred from the heat source outside wall to the inside of the vessel wall that is in direct contact with the feedstock mixture. The heat is then transferred to the surfaces of the feedstock and then transferred, again, through the feedstock until the internal areas of the feedstock are at a temperature near the temperature of the reaction chamber wall.

One problem with this type of external heating is that there are time lags between vessel wall temperature transmission and raising the feedstock temperature that is contained in the center of the vessel as well as the internal area of the feedstock matrix. Mixing the feedstock helps to mitigate these conditions. Still, millions of microenvironments exist within the reactor vessel environment and the feedstock particles themselves. This causes uneven heat distribution within the reaction chamber of varying degrees. These variant temperature gradients cause uncontrollable side reactions to occur as well as degradation of early conversion products that become over-reacted because of the delay in conversion reaction timeliness. It is desirable to produce and retain consistent heating throughout the feedstock and the reaction products so that good conversion economics are achieved and controllable. Microwave heating is an efficient heating method and it also serves to activate catalytic sites.

Embodiments of the invention are directed to a reaction chamber system that can be used to process any organic-carbon-containing feedstock, whether solid and/or liquid, to extract the volatile organic compounds in the feedstock at a temperature range that will produce liquid transportation fuels.

Microwaves are absorbed by the water molecules in the material that is irradiated in the microwave. When the water molecules absorb the microwaves, the molecules increase their vibrorotational motions, which create heat by friction, and the heat is convected to the surrounding material.

The reason microwaves are absorbed by water molecules is specific to the covalent bonds that attach the hydrogen to the oxygen in a water molecule. The oxygen atom in water has a large electronegativity associated with it. Electronegativity for an element is its propensity to collect extra electrons, either completely in an ionic bond or through skewing the electron cloud of a covalent bond toward that element. The driving force is from quantum chemistry, namely the filling of the 2p shell of oxygen from the addition of 2 electrons. The electronegativity scale, driven by the stability of filling the outer electron shell, starting at the most electronegative element, is F>O>N>Cl>Br>S>C>H. Therefore, the valence electrons in water are skewed toward the oxygen, creating a permanent electric dipole moment with the negative pole toward the oxygen and the positive pole between the two hydrogen atoms.

The electrons from the two hydrogen atoms are drawn closer to the oxygen atom. This gives this end of the molecule a slight negative charge and the two hydrogen atoms then have a slight positive charge. The consequence of this distortion is that the water molecule possesses a permanent electric dipole. The dipole feature of the water molecule allows the molecule to absorb the microwave radiation and increases the rotational speed of gaseous water molecules and/or increases the low frequency vibrational movements associated with frustrated rotations of the extended structure of liquid water. The increased motion of the water molecules causes friction that turns to heat and then convects out into the irradiated material.

To take advantage of this feature of microwave radiation, a reaction chamber system described herein takes advantage of microwave irradiation and heating in processing feedstock that contains carbon and can be converted to transportation fuels. The reactor may be made from a substantially microwave transparent substance such as quartz, a crystalline material that is substantially transparent to microwave radiation. Because quartz can be manipulated into many shapes, it provides design discretion for shaping the reaction chamber, but in one example the reaction chamber is configured in the shape of a tube or cylinder. The cylindrical shape allows for the feedstock to feed in one end and exit at the opposite end. An example of a suitable reaction chamber would be a quartz tube that is about four feet (1.2 meters) long with a wall thickness of about 3/16 inch (4.8 mm).

The microwave reaction chamber is surrounded by a microwave reflective enclosure. This causes the microwave radiation to pass repeatedly through the reaction chamber and devolatize the organic-carbon-containing feedstock after the water, if present, is evaporated and driven off. The microwave reflective enclosure is any that reflects microwaves. Materials include, for example, sheet metal assembled as Faraday cages that are known to the art.

Microwave radiation is generated by a magnetron or other suitable device. One or more microwave producing devices, e.g., magnetrons can be mounted external to the quartz tube wall. Magnetrons come in different power ranges and can be controlled by computers to irradiate the processing feedstock with the proper power to convert the feedstock to most desirable fuel products efficiently, given the residence time in the reactor. In one application, the magnetron can be mounted on a cage that would rotate around the outside of the reactor tube as well as travel the length of the reactor tube. Feedstock traveling through the length of the inside of the tube will be traveling in a plug flow configuration and can be irradiated by fixed and/or rotating magnetrons. A computer may be used to control the power and/or other parameters of the microwave radiation so that different feedstock, with different sizes and densities can be irradiated at different parameter settings specific to the feedstock and thus convert the feedstock more efficiently.

These configurations of a reactor will allow efficient processing of feedstock, from relatively pure feedstock streams to mixed feedstock streams that include feedstock of different densities, moisture contents, and chemical makeup. Efficiencies can occur because the fuel products are extracted from the reactor chamber as they are vaporized from the feedstock, but further processing of the remaining feedstock occurs until different fuel products are vaporized and extracted. For example, dense feedstock, such as plastics, take longer to process into a useable fuel than less dense feedstock, such as foam or wood chips. The microwave sub-system described herein continues to process dense feedstock without over-processing the earlier converted products from the less dense feedstock. This is accomplished by using both stationary and rotating microwave generators.

One example of a mixed feedstock would be unsorted municipal solid waste. In some implementations, catalyst may be added in the feedstock which helps in the conversion of the feedstock as well as the speed at which the conversion can progress. A catalyst can be designed to react at the preset processing temperature inside the reactor or to react with the impinging microwave radiation. In some embodiments, no catalyst is required. In other embodiments, the catalyst may be a rationally designed catalyst for a specific feedstock.

The plug flow configuration with the reactors described herein will allow adjustments to the residence time that the feedstock resides within the reactor core for more efficient exposure to the heat and the radiation of the microwaves to produce the desired end products.

Inlets and/or outlets, e.g., quartz inlets and/or outlets can be placed along the walls of the reaction chamber to allow for pressure and/or vacuum control. The inlets and outlets may allow the introduction of inert gases, reactive gases and/or the extraction of product gases.

Thus, the design of the microwave-transparent reaction chamber, the use of microwaves as a heating and radiation source with fixed and/or rotating magnetrons, plug flow processing control, with or without the use of catalysts, will allow the processing of any organic-carbon-containing feedstock. An advantage to beneficiating the organic-carbon-containing feedstock is that it has, to a large extent, already been brought to an acceptable moisture level and is already fairly homogeneous. For homogeneity on the macro-scale, the output from different organic-carbon-containing feedstock inputs have substantially similar characteristics (e.g. energy density, consistency, moisture content), and these characteristics extend throughout the material. On, the molecular scale, with fewer salts present, there are fewer microenvironments where the microwaves would deposit energy differently than in the bulk of the organic-carbon-containing feedstock. Therefore, the heating would be more uniform from beneficiated organic-carbon-containing feedstock than from raw unprocessed organic-carbon-containing feedstock inputs.

A microwave sub-system in accordance with embodiments of the invention includes a reaction chamber having one or more substantially microwave-transparent walls and a microwave heating/radiation system. The microwave heating/radiation system is arranged so that microwaves generated by the heating/radiation system are directed through the substantially microwave-transparent walls of the reaction chamber and into the reaction cavity where the feedstock material is reacted without substantially heating the walls of the reaction chamber. To enhance the temperature uniformity of the feedstock, the reaction chamber and the heating/radiation system may be in relative motion, e.g., relative rotational and/or translational motion. In some implementations, the heating system may rotate around a stationary reaction chamber. In some implementations, the feedstock within the reaction chamber may rotate by the use of flights with the heating/radiation system remaining stationary. In some implementations, the reaction chamber may rotate with the heating system remaining stationary. In yet other implementations, both the reaction chamber and the heating/radiation system may rotate, e.g., in countercurrent, opposing directions. To further increase temperature uniformity, the system may include a mechanism for stirring and/or mixing the feedstock material within the reaction chamber. The reaction chamber may be tilted during reaction process, for example, to force the feedstock to go through the catalytic bed.

Figure 10A:
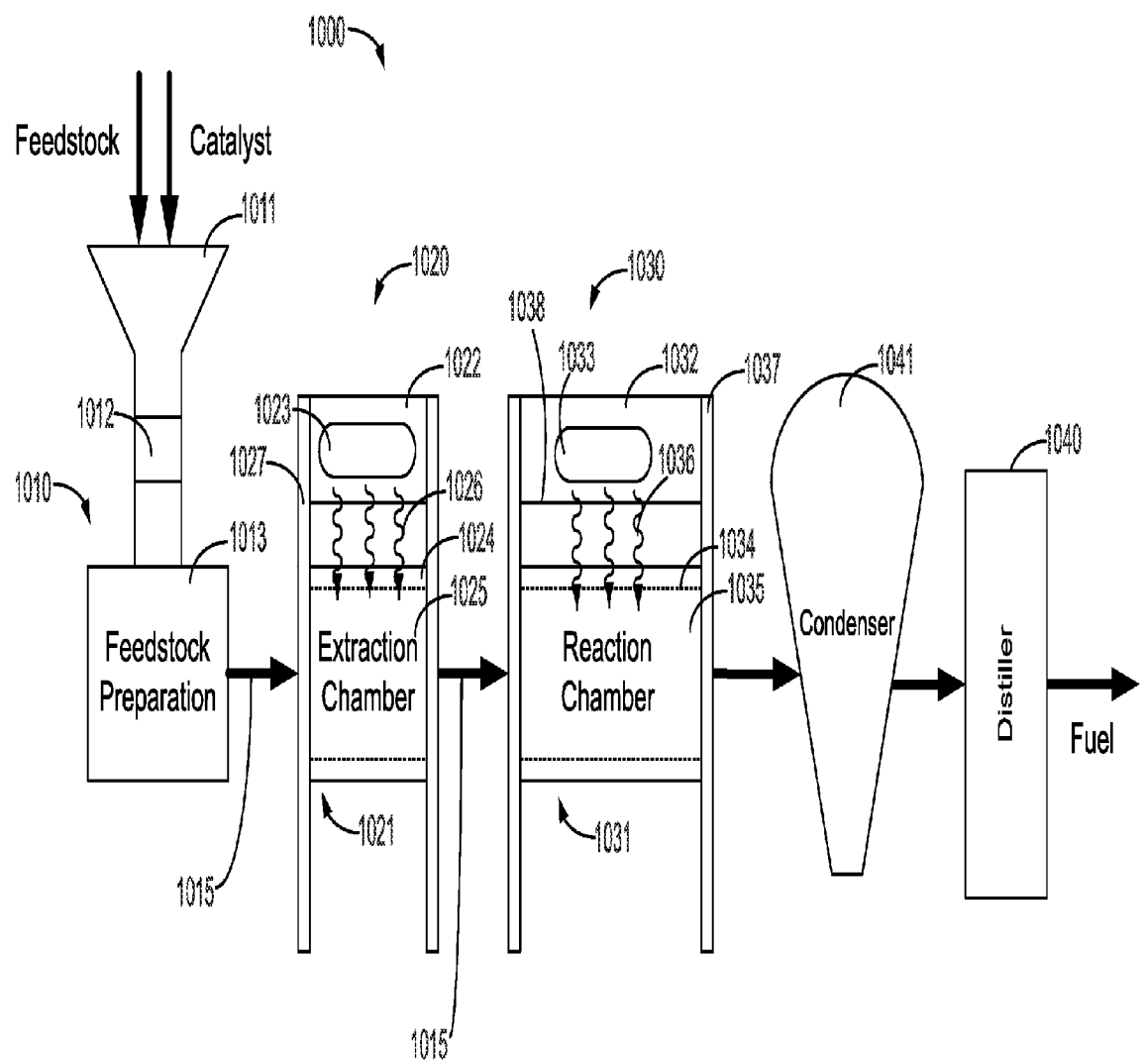
FIG. 10A is a block diagram of an embodiment of the microwave sub-system that uses the reaction chamber illustrated in FIGS. 9A and 9B for water/air extraction and a reaction process.
Figure 10B:
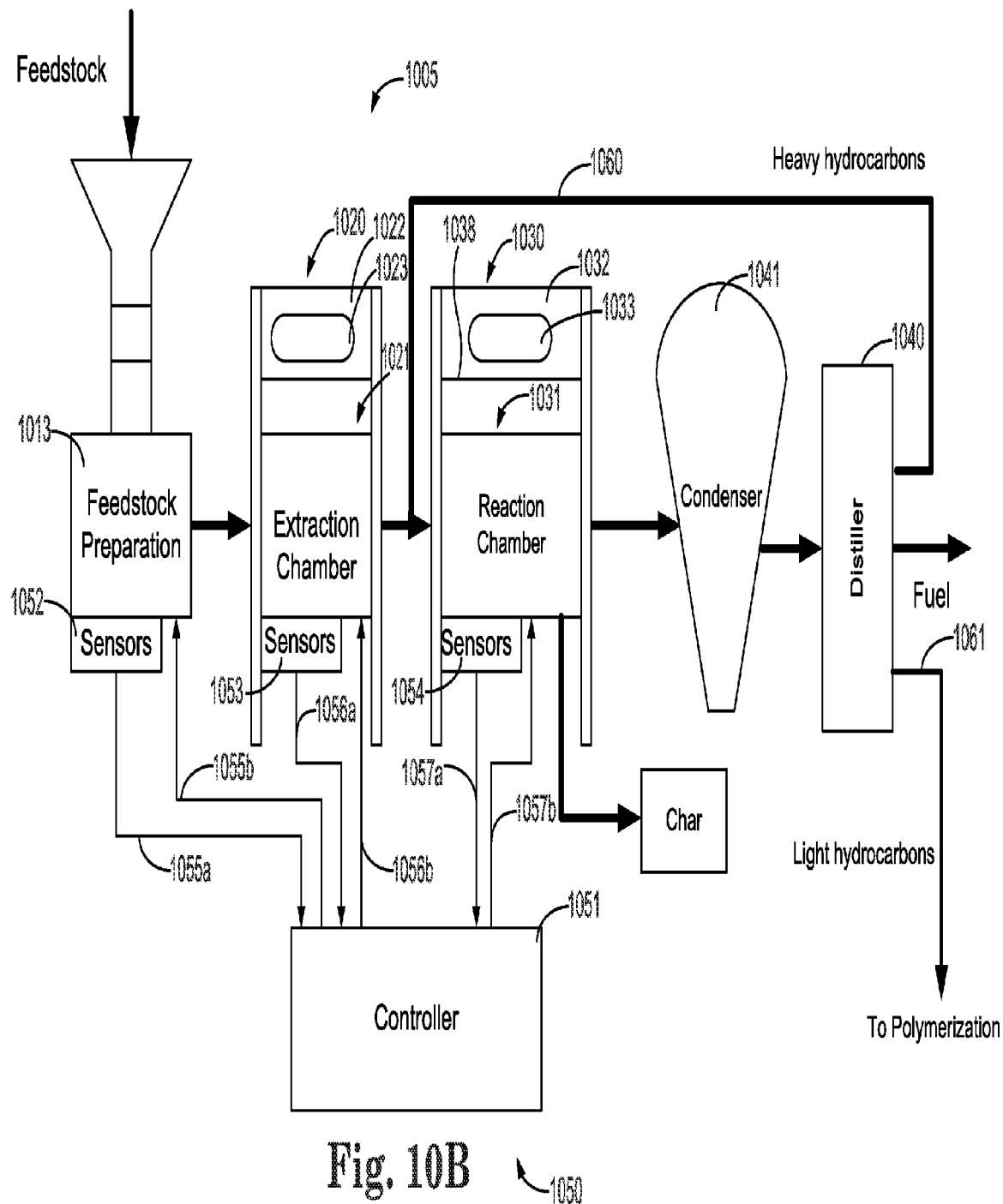
FIG. 10B illustrates an embodiment of the microwave sub-system that includes feedback control.

FIGS. 9A and 10B illustrate side and cross sectional views, respectively, of a microwave sub-system (900) for converting organic-carbon-containing feedstock to liquid processed pyrolysis oil fuel and biochar fuel in accordance with embodiments of the invention. Although a reaction chamber (910) may be any suitable shape, reaction chamber 910 is illustrated in FIGS. 9A and 9B as a cylinder having a cylindrical wall (911) that is substantially transparent to microwaves in the frequency range and energy used for the reaction process. Reaction chamber 910 includes a reaction cavity (912) enclosed by cylindrical wall 911. Microwave sub-system 900 includes a transport mechanism (918) configured to move the feedstock through the reaction chamber. The operation of microwave sub-system 900 with regard to the reactions taking place within reaction chamber 910 may be modeled similarly to that of a plug flow reactor.

As illustrated in FIG. 9A, a microwave sub-system includes transport mechanism 918 for moving the feedstock material through reaction chamber 910. Transport mechanism 918 is illustrated as a screw auger, although other suitable mechanisms, e.g., conveyer, may also be used. Transport mechanism 918 may further provide for mixing the feedstock within the reaction chamber. In some embodiments, reaction chamber wall 911 may have a thickness of about 3/16 inch (4.8 millimeters). The smoothness of reaction chamber wall 911 facilitates the movement of the feedstock through reaction chamber 910.

A heating/radiation subsystem (915) may include any type of heating and/or radiation sources, but preferably includes a microwave generator (916) such as a magnetron which is configured to emit microwaves (913) having a frequency and energy sufficient to heat the organic-carbon-containing feedstock to a temperature sufficient to facilitate the desired reaction of the feedstock, for example, for deconstruction of the feedstock, microwaves in a frequency range of about 0.3 GHz to about 300 GHz may be used. For example, the operating power of the magnetrons may be in the range of about 1 Watt to 500 kilowatts. Magnetron 916 is positioned in relation to reaction chamber 910 so that microwaves 913 are directed through wall 911 of reaction chamber 910 and into reaction cavity 912 to heat and irradiate the material therein. A mechanism (917) provides relative motion between magnetron 916 and reaction chamber 910 along and/or around longitudinal axis 920 of reaction chamber 910. In some embodiments, mechanism 917 may facilitate tilting reaction chamber 910 and/or magnetron 916 at an angle θ (see FIG. 9C) to facilitate the reaction of the feedstock and/or the extraction of gases, for example. In the embodiment illustrated in FIGS. 9A-C, magnetron 916 is positioned on rotational mechanism 917, such as a rotatable cage or drum that rotates magnetron 916 around stationary reaction chamber 910. In some implementations, the rotation around the chamber may not be complete, but the rotation path may define an arc around the circumference of the reaction chamber. The rotation may occur back and forth along the path of the arc. As previously mentioned, in some embodiments, reaction chamber 910 may be the rotating component, or both magnetron 916 (also called the heating/radiation subsystem) and reaction chamber 910 may rotate, e.g., in opposing, countercurrent directions. The rotation between the reaction chamber and the magnetron provides more even heating and more even microwave exposure of the feedstock within reaction cavity 912, thus enhancing the efficient reaction chemistry of the feedstock and/or other processes that are temperature/radiation dependent, such as removal of water from the feedstock. The rotation lessens the temperature gradient and/or maintains a more constant microwave flux across the plug inside the reaction chamber.

Reaction chamber 910 may include one or more entry ports (920), e.g., quartz entry ports, configured to allow the injection or extraction of substances into or out of reaction cavity 912. Reaction chamber 910 is also surrounded by a microwave-reflective enclosure (922). In one implementation, the quartz ports may be used to extract air and/or oxygen from the reaction cavity. Extraction of air and/or oxygen may be used to suppress combustion which is desirable for some processes.

For example, in certain embodiments, microwave sub-system 900 may be used to preprocess the feedstock through compression and/or removal of air and/or water. In this application, gases such as hydrogen and/or nitrogen may be injected through one or more ports 920 to hydrogenate and/or suppress combustion of the feedstock. Reaction chamber 910 may also include one or more exit ports (921), e.g., quartz exit ports, configured to allow passage of water, water vapor, air, oxygen and/or other substances and/or by-products from reaction chamber 910. In other embodiments, the processed organic-carbon-containing feedstock is already sufficiently compressed and reduced in both air and water to be introduced directly into the reaction chamber.

FIG. 9D is a diagram illustrating a microwave-sub-system (950) for producing fuel from organic-carbon-containing feedstock in accordance with embodiments of the invention. Microwave sub-system 950 includes an input hopper (also referred to as a load hopper) (951) configured to allow introduction of the feedstock material into microwave sub-system 950. A gearmotor auger drive (952) provides a drive system for the auger (953) that transports the feedstock through microwave sub-system 950. As the feedstock is compressed in load hopper 951, air is extracted through an atmosphere outlet (954). A seal (955) isolates load hopper 951 from a reaction chamber (956) to maintain a level of vacuum. Reaction chamber 956 includes walls of a microwave-transparent material. One or more stationary microwave heads 957 are positioned at the walls of the reaction chamber 956. In addition, microwave sub-system 950 includes one or more rotating microwave heads (958). In one implementation, each rotating microwave head is located at a fixed position with respect the longitudinal axis (960) of reaction chamber 956. The rotating microwave head is mounted on a slipring bearing (959) which allows microwave head 958 to rotate around reaction chamber 956. A microwave reflective enclosure (962) encompasses reaction chamber 956. In some implementations rotating microwave head(s) 958 may rotate around the longitudinal axis 960 of the reaction chamber 956 as well as moving back and forth along the longitudinal axis 960. Microwave sub-system 950 includes a seal at the exit of reaction chamber 956 to maintain the reaction chamber vacuum. In some embodiments, the organic-carbon-containing feedstock is compressed in the sub-beneficiation system discussed earlier before it enters the microwave sub-system and little if any air extraction is needed.

FIG. 10A is a block diagram of a microwave sub-system 1000 that uses one or more of the reaction chamber illustrated in FIGS. 9A and 9B. The reaction chamber 1020, 1030 may be arranged and/or operated in series or in a parallel configuration. An extraction process (1020) and a reaction process (1030) depicted in FIGS. 10A and 10B are illustrated as occurring in two separate reaction chambers, e.g., that operate at different temperatures. Alternatively, the extraction process and the reaction process may be implemented in a single reaction chamber with two separate zones, e.g., two separate temperature zones.

In microwave sub-system 1000 of FIG. 10, one or both of water/air extraction section 1020 and reaction section 1030 may be similar to the reaction chamber in microwave sub-system 900 of FIGS. 9A and 9B. Organic-carbon-containing feedstock, such as, for example, one or more of manure containing plant cells, wood chips, and plant-based cellulose, enters the microwave sub-system through a hopper (1011), and traverses an airlock (1012) to enter a feedstock preparation module (1013). If needed, a catalyst, such as zeolite, and/or other additives that enhance the reaction process, for example to adjust the pH, may be introduced into microwave sub-system 1000 through input hopper 1011 and/or the entry ports (shown in FIG. 9B). In the feedstock preparation module 1013, the feedstock material may be shredded to a predetermined particle size that may be dependent on the properties of the feedstock, such as the purity, density, and/or chemical composition of the feedstock. If used, the catalyst may be added at the time that the feedstock is being prepared so that the catalyst is evenly dispersed within the feedstock material before entering a reaction chamber (1031). In general, the less uniform the feedstock, the smaller the particle size needed to provide efficient reaction.

After the initial feedstock preparation stage, the shredded and mixed feedstock is transported by a transport mechanism 1015 into the extraction chamber 1021 of the next stage of the process. An air/water extraction subsystem (1020), which performs the optional processes of water and/or air extraction prior to the reaction process, includes a heating/radiation module (1022) comprising at least a magnetron (1023) configured to generate microwaves (1026) that may be mounted on a rotational or stationary mechanism (1027). If mounted on a rotational mechanism, the mechanism rotates magnetron 1023 either partially or fully around extraction chamber 1021 as microwaves 1026 are directed through a wall (1024) of extraction chamber 1021 and into an extraction cavity (1025) impinging on and heating the feedstock therein. In some embodiments, heating module 1022 may utilize only one magnetron 1023 or only two or more magnetrons without using other heat/radiation sources.

In some embodiments, heating/radiation module 1022 may utilize magnetron 1023 in addition to other heat sources, such as heat sources that rely on thermal conduction through the wall of the extraction chamber, e.g., flame, steam, electrical resistive heating, recycled heat from the process, and/or other heat sources. During the air and/or water extraction process, the feedstock may be heated to at least 100 C, the boiling point of water, to remove excess water from the feedstock. The excess water (e.g., in the form of steam) and/or other substances may exit extraction chamber 1021 via one or more exit ports. Additives to the feedstock, such as inert and/or reactive gases including hydrogen and/or nitrogen, may be introduced via one or more input ports into extraction chamber 1021 of the water/air extraction process. In addition to being heated and irradiated by microwaves, the feedstock may also be subjected to a pressurized atmosphere and/or a vacuum atmosphere and/or may be mechanically compressed to remove air from extraction chamber 1021.

After the optional air and/or water extraction process, transport mechanism 1015 moves the feedstock to the next processing stage, a reaction section (1030) which involves the reaction process, e.g., thermal deconstruction, of the feedstock. After the feedstock/catalyst mixture enters a reaction chamber (1031) surrounded by the microwave reflecting enclosure (1038), the mixture is heated to a temperature that is sufficient to facilitate the desired reaction. For example a temperature of in a range of about 200 C to about 350 C is used to crack the hydrocarbons in the feedstock into shorter chains to produce liquid fuel through deconstruction. In addition to being heated, the feedstock may also be subjected to a pressurized atmosphere or a vacuum atmosphere, and/or may be mechanically compressed in reaction chamber 1031.

In some embodiments, heating/radiation in the reaction chamber 1031 is accomplished using a magnetron (1033) emitting microwaves (1036). Magnetron 1033 may rotate relative to reaction chamber 1031. As previously described in connection with the water extraction section 1020, a rotating magnetron (1033) may be supported by rotational mechanism (91037), such as a cage or drum. Rotational mechanism 1037 allows relative rotational motion between magnetron 1033 and reaction chamber 1031. For example, magnetron 1033 may rotate completely around reaction chamber 1031 or the rotation of magnetron 1033 may proceed back and forth along an arc that follows the circumference of reaction chamber 1031. The rotating magnetron heating system 1033 may be supplemented using a stationary magnetron, and/or other conventional heat sources such as a flame or electrical resistive heating. Rotating magnetron 1033 provides more even heating/radiation of the feedstock material and catalyst within a reaction cavity (1035) and enhances the heating properties over that of stationary heat sources.

The cracked hydrocarbons vaporize and are collected in a condenser (1041) and liquefy and then are sent to a distiller (1040) to produce the diesel fuel, while heavier, longer chain hydrocarbon molecules may be recycled back to the reaction chamber. In some implementations, distillation may not be necessary, and the fuel product only needs to be filtered.

In some configurations, it is desirable to control the processes of the reaction to allow a higher efficiency of fuel extraction from the feedstock. FIG. 10B is a block diagram of a microwave sub-system (1005) that includes the sub-system components described in connection with FIG. 10A along with a feedback control system (1050). The illustrated feedback control system 1050 includes a controller (1051) and one or more sensors (1052), (1053), (1054) which may be configured to sense parameters at various stages during the process. Feedback control system 1050 may include sensors 1052 at the feedstock preparation stage which are configured to sense parameters of the feedstock and/or feedstock preparation process. For example, sensors 1052, may sense the chemical composition of the feedstock, density, moisture content, particle size, energy content or other feedstock parameters. Sensors 1052 may additionally or alternatively sense the conditions within the feedstock preparation chamber, e.g., flow, pressure, temperature, humidity, composition of the gases present in the chamber, etc. Sensors 1052 develop signals (1055a) which are input to controller electronics 1051 where they are analyzed to determine the condition of the feedstock and/or the feedstock preparation process. In response to sensed signals 1055a, controller 1051 develops feedback signals (1055b) which control the operation of the feedstock preparation module (1013). For example, in some implementations, the controller 1051 may control feedstock preparation module 1013 to continue to shred and/or grind the feedstock material until a predetermined particle size and/or a predetermined particle size variation is detected. In another example, based on the sensed chemical composition of the feedstock, controller 1051 may cause a greater or lesser amount of catalyst to be mixed with the feedstock or may cause different types of catalyst to be mixed with the feedstock.

A control system (1050) may also develop feedback signals (1056b), (1057b) to control the operation of water extraction module 1020 and/or the reaction module 1030, respectively, based on sensed signals 1056a, 1057a. For example, the sensors (1053), (1054) may sense the temperature of the water extraction and/or reaction processes and controller 1051 may develop feedback signals 1056b, 1057b to control the operation of heating/radiation systems 1022, 1032, e.g., power, frequency, pulse width, rotational or translational velocity, etc. of one or both of magnetrons 1023, 1033. Controller 1051 may develop feedback signals to the magnetrons to control the amount of radiation impinging on the feedstock so that the feedstock will not be over-cooked or under-cooked and development of hot spots will be avoided. Controller system 1050 may control the injection of various substances into one or both of the extraction chamber and/or the reaction chamber 1021, 1031 through the entry ports to control the processes taking place within the chambers 1021, 1031. Biochar, the residue of the depleted feedstock, is sent to a storage unit. In some embodiments, controller system 0150 may be used to control conditions that beneficially affect the properties of the processed pyrolysis oil where specific properties are desired beyond that resulting just from the feedstock choice. After the distillation stage, the heavy hydrocarbons may be recycled back into the reaction chamber and the lighter hydrocarbons may be sent on to a polymerization stage.

Figure 11A:
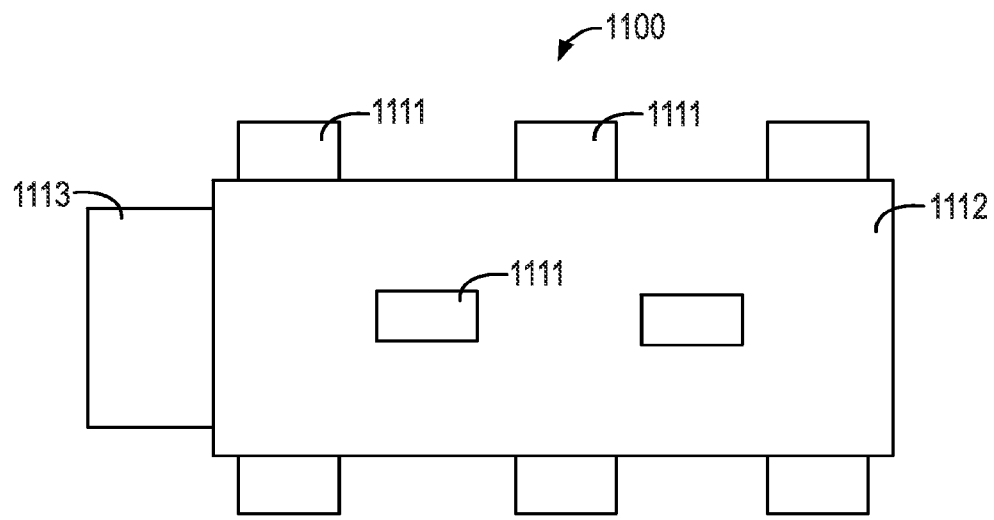
FIG. 11A shows a microwave sub-system which includes multiple stationary magnetrons arranged on a drum that is disposed outside a cylindrical reaction chamber having one or more microwave-transparent walls.
Figure 11B:
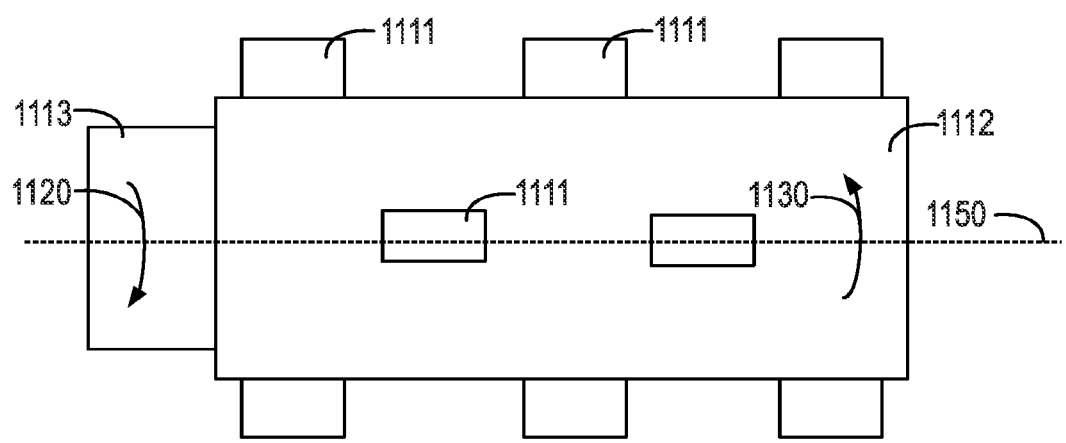
FIG. 11B illustrates an embodiment of a microwave sub-system having a drum supporting magnetrons which may be rotated around the longitudinal axis of the reaction chamber while the reaction chamber is concurrently rotated around its longitudinal axis.

The reaction chambers may be made of quartz, glass, ceramic, plastic, and/or any other suitable material that is substantially transparent to microwaves in the frequency and energy range of the reaction processes. In some configurations, the heating/radiation systems described herein may include one or more magnetrons that rotate relative to the reaction chamber. In some embodiments, the magnetrons may be multiple and/or may be stationary. FIG. 11A illustrates a reaction system (1100) which includes multiple stationary magnetrons (1111) arranged on a drum (1112) that acts as a Faraday cage and is disposed outside a cylindrical reaction chamber (1113) having one or more microwave-transparent walls. In reaction system 1100, the drums made of a material that is microwave opaque, such as, for example, metal, so as to cause the microwaves in reaction chamber 1113 to reflect back and forth through the feedstock, thus more efficiently being used to convert the feedstock into liquid fuel pyrolysis oil and solid fuel biochar. The operation of the magnetrons may be continuous, or may be pulsed, e.g., in a multiplexed pattern. In some embodiments (FIG. 11B), drum 1113 supporting magnetrons 1111 may be rotated (1130) around the longitudinal axis (1150) of reaction chamber 1112 and/or reaction chamber 1112 may be rotated (1120) around its longitudinal axis 1150.

Figure 11C:
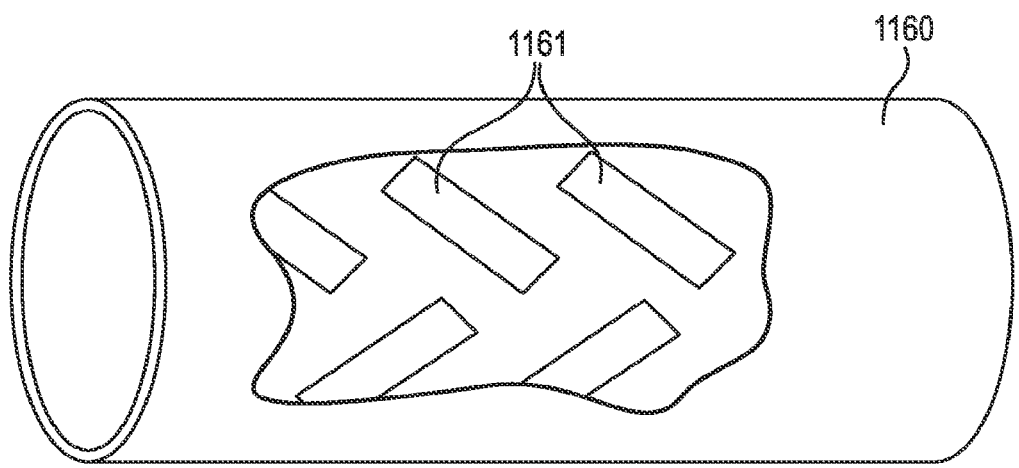
FIG. 11C shows an embodiment of a microwave-sub system reaction chamber with a feedstock transport mechanism comprising baffles.

A feedstock transport mechanism may be disposed within a reaction chamber. For example, as illustrated in FIG. 11C, the feedstock transport mechanism may comprise one or more baffles (1161) that are configured to move the feedstock through a reaction chamber (1160) as the reaction chamber rotates. The baffles 361 may be mounted to the walls of reaction chamber 1160 and/or may be otherwise installed within the reaction chamber to provide movement of feedstock within and through reaction chamber 1160, e.g., longitudinally through the reaction chamber.

Figure 12:
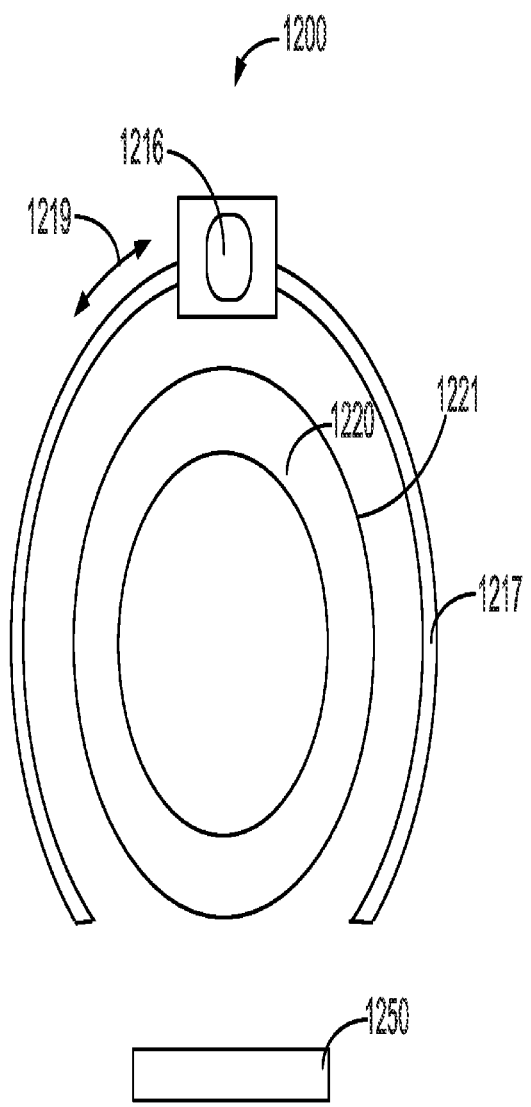
FIG. 12 illustrates a system having a rotating magnetron in addition to a secondary heat source.

In some embodiments, illustrated in FIG. 12, one or more secondary heat sources (1250), such as a flame, steam, and/or electric resistive heating, or recycled heat, may be used in addition to magnetrons (1216) which are stationary, or are supported on a mechanism (1217) that rotates around the circumference of the reaction chamber (1220) enclosed in a microwave-reflecting Faraday cage (1221). In some configurations, magnetrons 1216 may not make a complete revolution around reaction chamber 1220, but may rotate back and forth (1219) along an arc that follows the circumference of reaction chamber 1220. Various configurations are possible as long as the feedstock is exposed to substantially uniform heat throughout the mass of the feedstock particles to form processed pyrolysis oil having specific gravity, acid content, impurity concentrations and water-soluble salt concentrations as described above for processed pyrolysis oil of the invention.

Figure 13:
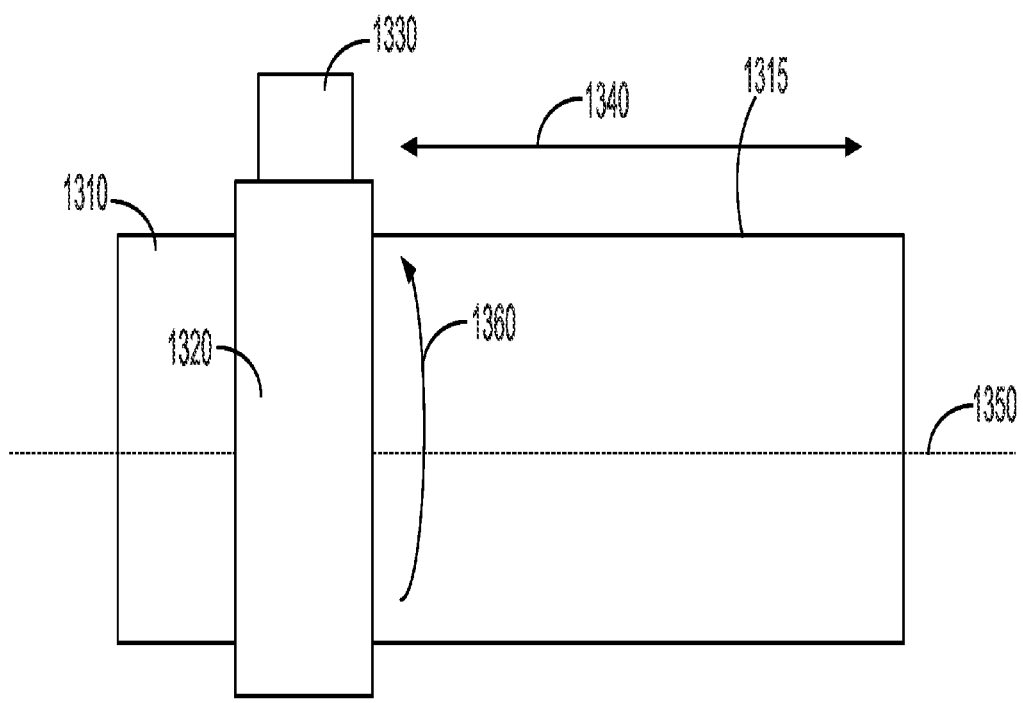
FIG. 13 depicts a microwave sub-system wherein a magnetron is moved along the longitudinal axis of the reaction chamber and is rotated around the longitudinal axis of the reaction chamber.

Movement of the one or more magnetrons relative to the reaction chamber may also include motion that moves the magnetron along the longitudinal axis of the reaction chamber, as illustrated in FIG. 13. A reaction chamber (1310) and a cage (1320) are illustrated that support a magnetron (1330). Cage 1320 and magnetron 1330 may be moved (1340) back and forth along the longitudinal axis (1350) of reaction chamber 1310 and over a metal microwave-reflecting Faraday cage (1315) enclosing reaction chamber 1310. In some implementations, in addition to and/or concurrent with the motion (1340) of cage 1320 and magnetron 1330 along longitudinal axis 1350, cage 1320, and magnetron 1330 may be rotated (1360) around the longitudinal axis 1350.

Process for Making Processed Pyrolysis Oil

The invention also comprises a process for making biochar. The process includes two aspects of the beneficiation process for making processed carbon-containing feedstock with the beneficiation sub-system discussed above and one aspect of the microwave process for converting the processed carbon-containing feedstock into biochar. Specifically, the process is one of making a solid fuel with three steps. The first is to input into a system, comprising a first sub-system and a second sub-system, an unprocessed organic-carbon-containing feedstock that includes free water, intercellular water, intracellular water, intracellular water-soluble salts, and at least some plant cells comprising cell walls that include lignin, hemicellulose, and microfibrils within fibrils. The second step is to pass the unprocessed organic-carbon-containing feedstock through the first sub-system, a beneficiation sub-system, to make processed organic-carbon-containing feedstock. The third step is to pass the processed organic-carbon-containing feedstock through a microwave sub-system to convert the processed organic-carbon-containing feedstock into the liquid processed pyrolysis oil fuel.

Beneficiation Sub-System Process

The beneficiation process step comprises the step of passing unprocessed organic-carbon-containing feedstock through a beneficiation sub-system process to result in processed organic-carbon-containing feedstock having a water content of less than 20 wt % and a salt content that is reduced by at least 60 wt % on a dry basis from that of the unprocessed organic-carbon-containing feedstock. There are two aspects of the beneficiation sub-system process. The first focuses on the properties of the processed organic-carbon-containing feedstock and the second focuses on the energy efficiency of the process of the invention over that of currently known processes for converting unprocessed organic-carbon-containing feedstock into processed organic-carbon-containing feedstock suitable for use with downstream fuel producing systems. Both use the beneficiation sub-system disclosed above.

First Aspect

The first aspect of the beneficiation process step of the invention comprises four steps. The first step is inputting into a reaction chamber unprocessed organic-carbon-containing feedstock comprising free water, intercellular water, intracellular water, intracellular water-soluble salts, and at least some plant cells comprising cell walls that include lignin, hemicellulose, and microfibrils within fibrils. Some embodiments have unprocessed organic-carbon-containing feedstock that comprises water-soluble salts having a content of at least 4000 mg/kg on a dry basis.

The second step is exposing the feedstock to hot solvent under pressure for a time at conditions specific to the feedstock to make at least some regions of the cell walls comprising crystallized cellulosic fibrils, lignin, and hemicellulose more able to be penetrable by water-soluble salts without dissolving more than 25 percent of the lignin and hemicellulose. As mentioned above, this is accomplished by one or more of unbundling regions of at least some fibrils, depolymerizing at least some strands of lignin and/or hemicellulose, or detaching them from the cellulose fibrils, thereby disrupting their interweaving of the fibrils. In addition, the cellulose fibrils and microfibrils can be partially depolymerized and/or decrystallized.

The third step is rapidly removing the elevated pressure so as to penetrate the more penetrable regions with intracellular escaping gases to create porous feedstock with open pores in at least some plant cell walls. In some embodiments the pressure is removed to about atmospheric pressure in less than 500 milliseconds (ms), less than 300 ms, less than 200 ms, less than 100 ms, or less than 50 ms.

The fourth step is pressing the porous feedstock with conditions that include an adjustable compaction pressure versus time profile and compaction time duration, and between pressure plates configured to prevent felt from forming and blocking escape from the reaction chamber of intracellular and intercellular water and intracellular water-soluble salts, and to create processed organic-carbon-containing feedstock that has a water content of less than 20 wt % and a water-soluble salt content that is decreased by at least 60% on a dry basis that of the unprocessed organic-carbon-containing feedstock. In some embodiments, the water content is measured after subsequent air-drying to remove remaining surface water. In some embodiments, the pressure plate has a pattern that is adapted to particular organic-carbon-containing feedstock based on its predilection to form felts and pith content as discussed above. In some embodiments, the pressure amount and pressure plate configuration is chosen to meet targeted processed organic-carbon-containing feedstock goals for particular unprocessed organic-carbon-containing feedstock. In some embodiments, the pressure is applied in steps of increasing pressure, with time increments of various lengths depending on biomass input to allow the fibers to relax and more water-soluble salt to be squeezed out in a more energy efficient manner. In some embodiments, clean water is reintroduced into the biomass as a rinse and the biomass is pressed again.

The process may further comprise a fifth step, prewashing the unprocessed organic-carbon-containing feedstock before it enters the reaction chamber with a particular set of conditions for each organic-carbon-containing feedstock that includes time duration, temperature profile, and chemical content of pretreatment solution to at least initiate the dissolution of contaminates that hinder creation of the cell wall passageways for intracellular water and intracellular water-soluble salts to pass outward from the interior of the plant cells.

The process may further comprise a sixth step, masticating. The unprocessed organic-carbon-containing feedstock is masticated into particles having a longest dimension of less than 1 inch (2.5 centimeters) before it enters the reaction chamber.

The process may further comprise a seventh step, separating out the contaminants. This step involves the separating out of at least oils, waxes, and volatile organic compounds from the porous feedstock with solvents less polar than water.

As with the system aspect, the unprocessed organic-carbon-containing feedstock may comprise at least two from a group consisting of an herbaceous plant material, a soft woody plant material, and a hard woody plant material that are processed in series or in separate parallel reaction chambers. In addition, in some embodiments, the energy density of each plant material in the processed organic-carbon-containing feedstock may be substantially the same. In some embodiments, the organic-carbon-containing feedstock comprises at least two from the group consisting of an herbaceous plant material, a soft woody plant material, and a hard woody plant material, and wherein the energy density of each plant material in the processed organic-carbon-containing feedstock is at least 33.0 MMBTU/ton (38.4 GJ/MT).

Figure 14:
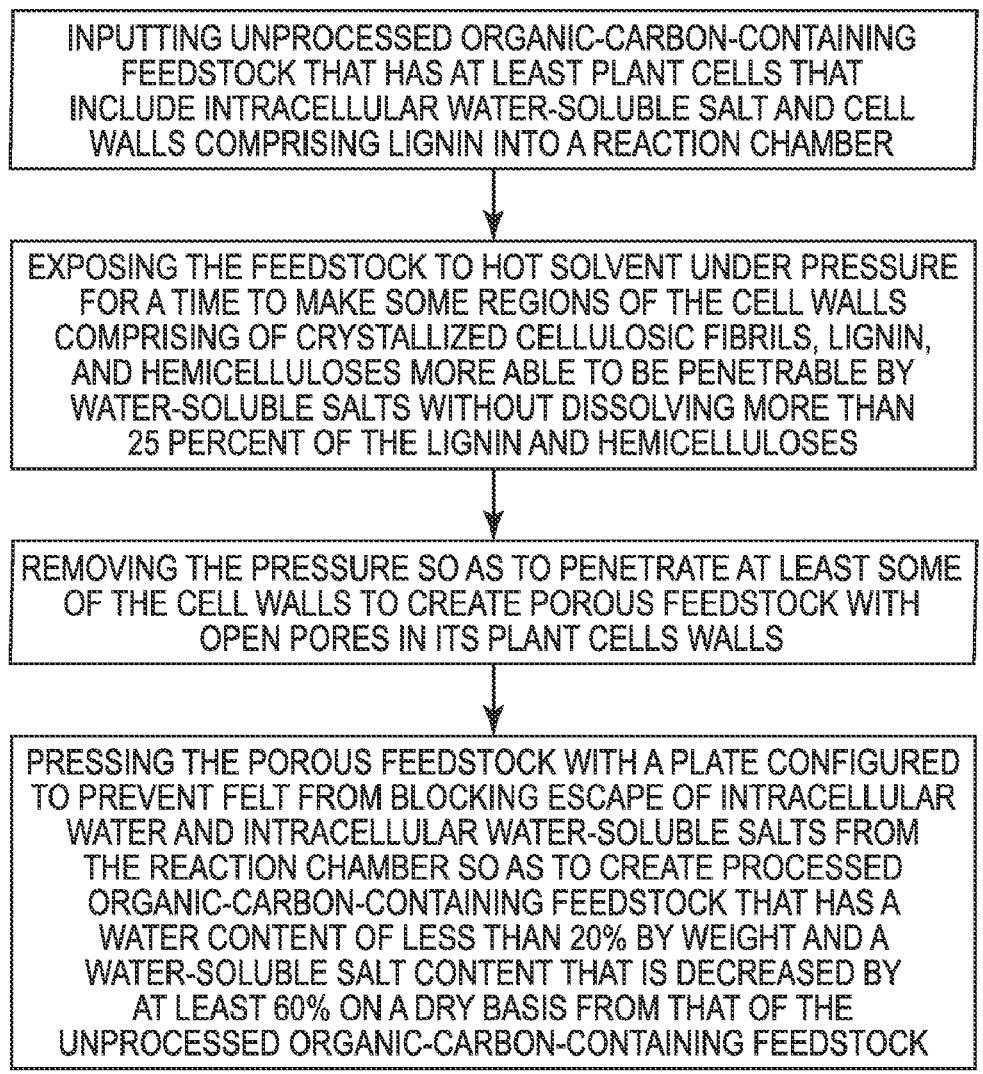
FIG. 14 is a block diagram of an embodiment of a process for passing unprocessed organic-carbon-containing feedstock through a beneficiation sub-system to create a processed organic-carbon-containing feedstock with a water content of less than 20 wt % and a water-soluble salt content that is decreased by more than 60 wt % on a dry basis from that of unprocessed organic-carbon-containing feedstock.

FIG. 14 is a block diagram of a process for making processed organic-carbon-containing feedstock with less than 60 percent water-soluble salt on a dry basis over that of its unprocessed form and with less than 20 wt % water.

Second Aspect

The second aspect is similar to the first except steps have an efficiency feature and the resulting processed organic-carbon-containing feedstock has a cost feature. The second aspect also comprises four steps. The first step is inputting into a reaction chamber organic-carbon-containing feedstock comprising free water, intercellular water, intracellular water, intracellular water-salts, and at least some plant cells comprising lignin, hemicellulose, and fibrils within fibril bundles. Each step emphasizes more specific conditions aimed at energy and material conservation. The second step is exposing the feedstock to hot solvent under pressure for a time at conditions specific to the feedstock to swell and unbundle the cellular chambers comprising partially crystallized cellulosic fibril bundles, lignin, hemicellulose, and water-soluble salts without dissolving more than 25 percent of the lignin and to decrystallize at least some of the cellulosic bundles. The third step is removing the pressure to create porous feedstock with open pores in its cellulosic chambers. The fourth step is pressing the porous feedstock with an adjustable compaction pressure versus time profile and compaction duration between pressure plates configured to prevent felt from forming and blocking escape from the reaction chamber of intracellular and intercellular water and intracellular water-soluble salts, and to create a processed organic-carbon-containing feedstock that has a water content of less than 20 wt %, a water-soluble salt content that is decreased by at least 60 wt % on a dry basis, and a cost per weight of removing the water and the water-soluble salt that is reduced to less than 60% of the cost per weight of similar water removal from known mechanical, known physiochemical, or known thermal processes.

Figure 15:
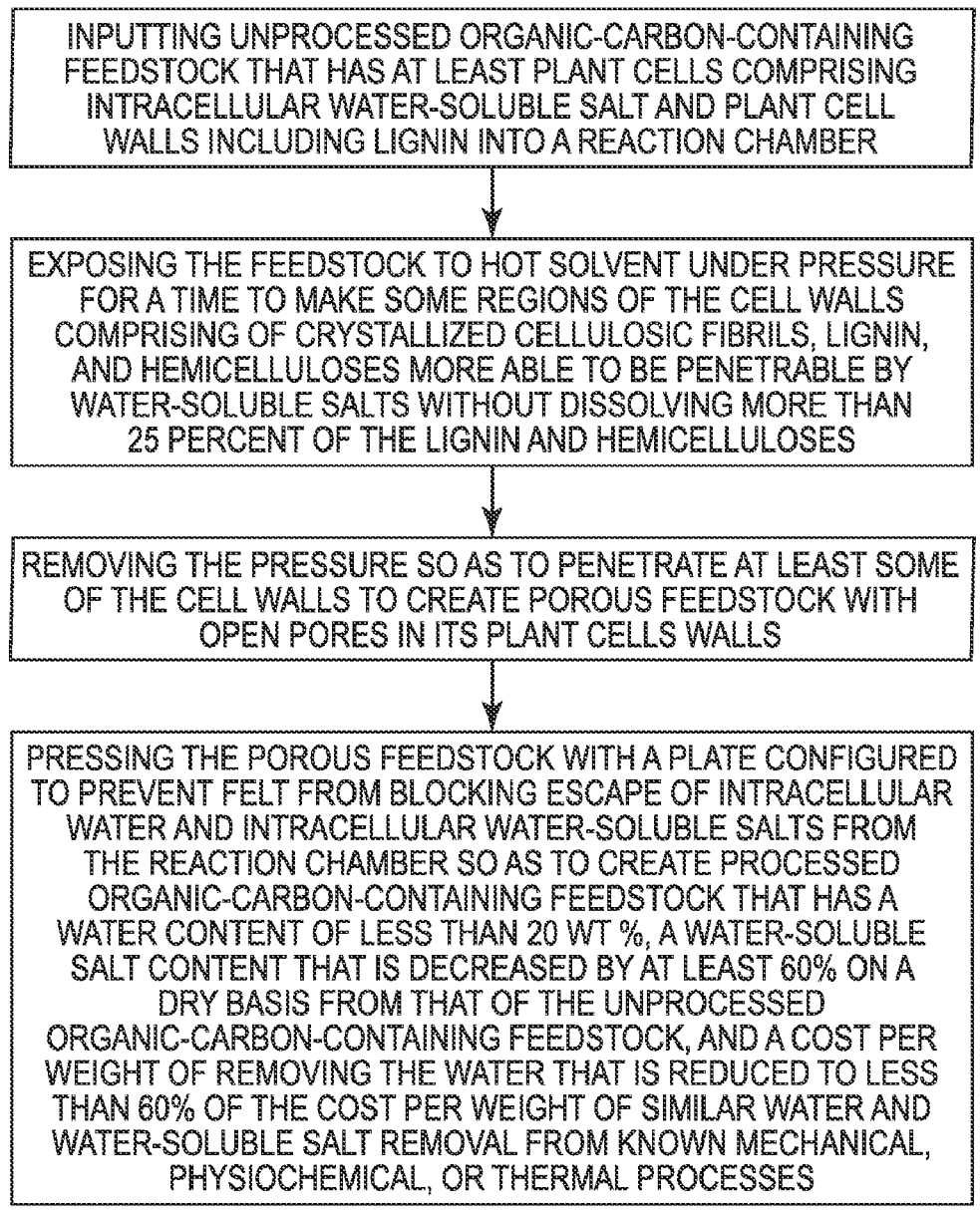
FIG. 15 is a block diagram of an embodiment of a process for passing unprocessed organic-carbon-containing feedstock through a beneficiation sub-system to create a processed organic-carbon-containing feedstock with a water content of less than 20 wt %, a water-soluble salt content that is decreased by more than 60 wt % on a dry basis from that of unprocessed organic-carbon-containing feedstock, and an energy cost of removing the water-soluble salt and water that is reduced to less than 60% of the cost per weight of similar removal from known mechanical, known physiochemical, or known thermal processes.

FIG. 15 is a block diagram of a process for making processed organic-carbon-containing feedstock with a water-soluble salt content that is decreased by at least 60 wt % on a dry basis from that of the unprocessed organic-carbon-containing feedstock, and a water content of less than 20 wt %, and at a cost per weight of less than 60% that of similar water removal from known mechanical, known physiochemical, or known thermal processes that can remove similar amounts of water and water-soluble salt Energy efficiencies are achieved in part by tailoring process conditions to specific organic-carbon-containing feedstock as discussed above. Some embodiments use systems engineered to re-capture and reuse heat to further reduce the cost per ton of the processed organic-carbon-containing feedstock. Some embodiments remove surface or free water left from the processing of the organic-carbon-containing feedstock with air drying, a process that takes time but has no additional energy cost. FIG. 16 is a table that shows some process variations used for three types of organic-carbon-containing feedstock together with the resulting water content and water-soluble salt content achieved. It is understood that variations in process conditions and processing steps may be used to raise or lower the values achieved in water content and water-soluble salt content and energy cost to achieve targeted product values. Some embodiments have achieved water contents as low as less than 5 wt % and water-soluble salt contents reduced by as much as over 95 wt % on a dry basis from its unprocessed feedstock form.

Microwave Sub-System Process

The microwave sub-system process step comprises passing the processed organic-carbon-containing feedstock through a microwave sub-system process to result in a solid fuel composition having an energy density of at least 33.0 MMBTU/ton (38.4 GJ/MT) a water content of less than 15 wt %, and a pH of at least as high as 4.0. In some embodiments the specific gravity of the composition is less than 1.05. In some embodiments the water content of the composition is less than 10 wt %. In some embodiments, the pH of the composition is at least as high as 5.0

Figure 17:
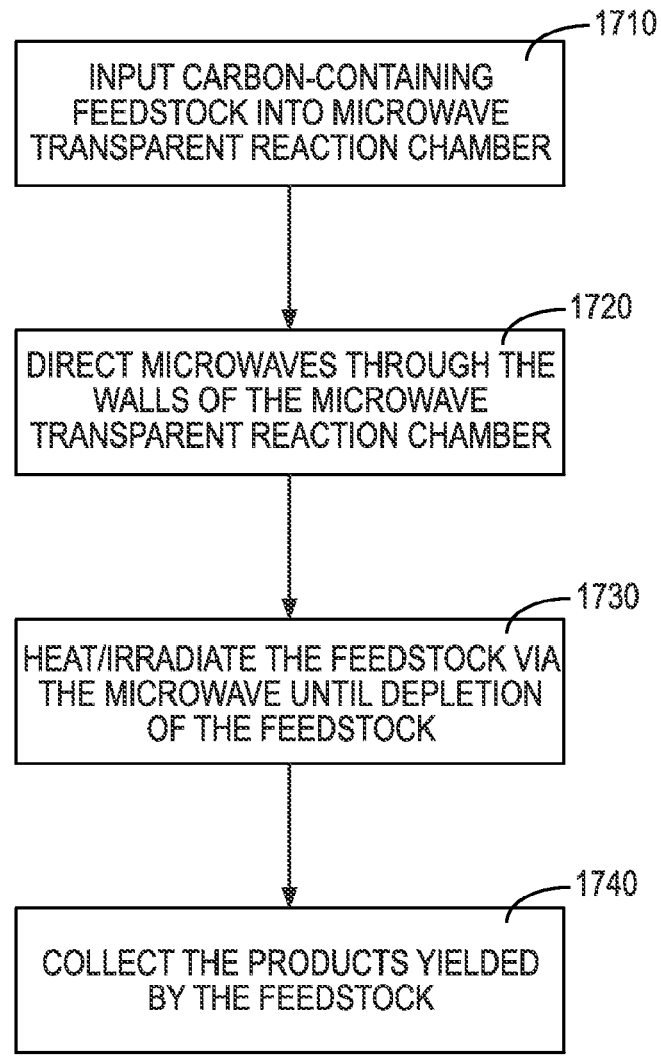
FIG. 17 is a block diagram of an embodiment of a process for passing processed organic-carbon-containing feedstock through a microwave sub-system to create a liquid fuel pyrolysis oil having an energy density of at least 33.0 MMBTU/ton (38.4 GJ/MT), a water content of less than 15 wt %, and a pH at least as high as 4.0

FIG. 17 is a block diagram of an embodiment of a process for passing processed organic-carbon-containing feedstock through a microwave sub-system to create a solid fuel processed pyrolysis oil of the invention. The processed organic-carbon-containing feedstock is input (1710) to a reaction chamber having walls that are substantially transparent to microwaves used to heat and/or irradiate the feedstock. The heating and/or radiation occur by directing (1720) the microwave energy through the walls of the reaction chamber so that it impinges on the feedstock disposed within the reaction chamber. The feedstock is heated/irradiated (1730) by the microwaves, optionally in the presence of a catalyst, until reaction of the organic-carbon-containing molecules occurs to produce the desirable end fuel product. The fuel product created by the reaction processes are collected (1740).

Various modifications and additions can be made to the preferred embodiments discussed hereinabove without departing from the scope of the present invention. Accordingly, the scope of the present invention should not be limited by the particular embodiments described above, but should be defined only by the claims set forth below and equivalents thereof.

What is claimed is:

1. A composition, comprising:
   a processed pyrolysis oil composition that comprises a liquid renewable carbon fuel with characteristics that include an energy density of at least 33.0 MMBTU/ton (38.4 GJ/MT), a water content of less than 15 wt %, and a pH of at least as high as 4.0, and
   the processed pyrolysis oil is made from unprocessed organic-carbon-containing feedstock that is converted into the processed organic-carbon-containing feedstock with a beneficiation sub-system, and to the processed pyrolysis oil with a microwave sub-system.

2. The composition of claim 1, wherein the beneficiation sub-system comprises:
   a transmission device configured to convey into a reaction chamber unprocessed organic-carbon-containing feedstock comprising free water, intercellular water, intracellular water, intracellular water-soluble salts, and at least some plant cells comprising cell walls that include lignin, hemicellulose, and microfibrils within fibrils;
   at least one reaction chamber comprising at least one entrance passageway, at least one exit passageway for fluid, at least one exit passageway for processed organic-carbon-containing feedstock, and at least three sections, the sections comprising:
      a wet fibril disruption section configured to interact with at least some of the lignin and hemicellulose between the fibrils to make at least some regions of the cell wall more susceptible to outflow by water-soluble salts,
      a vapor explosion section in communication with the wet fibril disruption section and at least configured to volatilize plant fibril permeable fluid through rapid decompression to penetrate the more susceptible regions of the cell wall so as to create a porous organic-carbon-containing feedstock with plant cell wall passageways for intracellular water and intracellular water-soluble salts to pass from the plant cell, and
      a compaction section in communication with the vapor explosion section and configured to compress the porous organic-carbon-containing feedstock between pressure plates so as to permit the escape of intracellular water and intracellular water-soluble salt from the reaction chamber fluid exit passageway and to create processed organic-carbon-containing feedstock that passes out through its reaction chamber exit passageway; and
   a collection device in communication with the reaction chamber and configured to gather the processed organic-carbon-containing feedstock having a water content of less than 20% by weight and a water-soluble salt content that is decreased by at least 60% on a dry basis from that of the unprocessed organic-carbon-containing feedstock.

3. The composition of claim 1 wherein the microwave sub-system, comprises:
   at least one reaction chamber within a microwave reflecting enclosure, the reaction chamber comprising at least one microwave-transparent chamber wall and at least one reaction cavity within the reaction chamber that is configured to hold the organic-carbon-containing feedstock in an externally supplied oxygen free atmosphere;

a microwave subsystem comprising at least one device configured to emit microwaves when energized, the microwave device positioned relative to the reaction chamber so that the microwaves are directed through the microwave-transparent chamber wall and into the reaction cavity; and a mechanism configured to provide relative motion between the microwave device and the reaction chamber.

4. The pyrolysis oil composition of claim 1, further comprising: a water content of less than 10 wt %.

5. The pyrolysis oil composition of claim 1, further comprising: less than 5 weight percent volatiles.

6. The pyrolysis oil composition of claim 1, further comprising: a pH of at least as high as 5.0.

7. The pyrolysis oil composition of claim 1, further comprising: a pH of at least as high as 6.0.

8. The pyrolysis oil composition of claim 6 wherein the pH is at least one pH number greater than would have been in a pyrolysis oil made with the unprocessed organic-carbon-containing feedstock passed through the microwave sub-system.

9. The pyrolysis oil composition of claim 1, further comprising: a specific gravity of less than 1.05.

10. The pyrolysis oil composition of claim 1 wherein specific gravity is at least 0.1 less than would have been in a pyrolysis oil composition made with the unprocessed organic-carbon-containing feedstock passed through the microwave sub-system.

11. The pyrolysis oil composition of claim 1, further comprising: having a specific gravity that is at least 20 percent less than would have been in a pyrolysis oil composition made with the unprocessed organic-carbon-containing feedstock passed through the microwave sub-system.

12. The pyrolysis oil composition of claim 1, further comprising: at least 50 percent less tar by weight than the tar in a pyrolysis oil composition made with the same feedstock but using a thermal process that creates a liquid phase during the process.

13. The composition of claim 2 wherein the processed organic-carbon-containing feedstock is from at least two unprocessed organic-carbon-containing feedstock from a group consisting of a herbaceous plant material, a soft woody plant material, and a hard woody plant material, wherein each type passes in series through the at least one reaction chamber, and wherein the energy density of each processed plant material in the processed organic-carbon-containing feedstock is at least 20 MMBTU/ton (23.3 GJ/MT).

14. The composition of claim 2 wherein the unprocessed organic-carbon-containing has a water-soluble salt content of at least 4000 mg/kg on a dry basis.

15. The composition of claim 2 wherein the beneficiation sub-system, further comprises:

a pretreatment chamber that is configured to use for each organic-carbon-containing feedstock a particular set of conditions including time duration, temperature profile, and the chemical content of pretreatment solution to at least initiate the dissolution of contaminates that would hinder creation of the plant cell wall passageways that allow intracellular water and intracellular water-soluble salts to pass outward from the plant cells.

16. The composition of claim 2 wherein the vapor explosion section, further comprises:

at least one rinsing subsection configured to flush at least some of the water-soluble salt from the porous organic-carbon-containing feedstock before it is passed to the compaction section.

* * * * *